(12) United States Patent
Zeng et al.

(10) Patent No.: US 10,098,173 B2
(45) Date of Patent: Oct. 9, 2018

(54) DATA TRANSMISSION METHOD AND DEVICE

(71) Applicant: Huawei Technologies Co., Ltd., Shenzhen (CN)

(72) Inventors: Qinghai Zeng, Shanghai (CN); Hongping Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 157 days.

(21) Appl. No.: 15/338,705

(22) Filed: Oct. 31, 2016

(65) Prior Publication Data

US 2017/0048914 A1   Feb. 16, 2017

Related U.S. Application Data

(63) Continuation of application No. PCT/CN2014/076520, filed on Apr. 29, 2014.

(51) Int. Cl.
| | |
|---|---|
| *H04W 76/02* | (2009.01) |
| *H04W 84/12* | (2009.01) |
| *H04W 88/06* | (2009.01) |
| *H04W 88/10* | (2009.01) |
| *H04W 76/16* | (2018.01) |
| *H04W 76/12* | (2018.01) |

(Continued)

(52) U.S. Cl.
CPC .......... *H04W 76/16* (2018.02); *H04W 28/08* (2013.01); *H04W 72/048* (2013.01); *H04W 76/12* (2018.02); *H04W 76/11* (2018.02); *H04W 84/12* (2013.01)

(58) Field of Classification Search
None
See application file for complete search history.

(56) References Cited

U.S. PATENT DOCUMENTS

| | | |
|---|---|---|
| 2007/0147299 A1 | 6/2007 | Ando et al. |
| 2010/0208653 A1 | 8/2010 | Morinaga et al. |

(Continued)

FOREIGN PATENT DOCUMENTS

| | | |
|---|---|---|
| CN | 102918925 A | 2/2013 |
| CN | 103096474 A | 5/2013 |

(Continued)

OTHER PUBLICATIONS

Foreign Communication From a Counterpart Application, Chinese Application No. 201480001015.8, Chinese Office Action dated Mar. 9, 2018, 13 pages.

(Continued)

*Primary Examiner* — Duc T Duong
(74) *Attorney, Agent, or Firm* — Conley Rose, P.C.

(57) ABSTRACT

A data transmission method including sending, by a base station, request information, an identifier of a wireless local area network (WLAN) access point (AP), and a first Internet Protocol (IP) address of the base station to user equipment, receiving, by the base station, a second IP address assigned by the WLAN AP to the user equipment and confirmation information that are sent by the user equipment, and performing, by the base station, multi-stream aggregation data transmission to the user equipment using the WLAN AP and through the IP tunnel, where the IP tunnel is determined using the first IP address and the second IP address.

28 Claims, 6 Drawing Sheets

---

A base station sends request information, an identifier of a WLAN AP, and a first IP address of the base station to UE, where the request information is used to request the UE to perform multi-stream aggregation data transmission to the base station using the WLAN AP — 601

The base station receives a second IP address assigned by the WLAN AP to the UE and confirmation information that are sent by the UE, where the confirmation information is used to confirm that the UE performs multi-stream aggregation data transmission to the base station using the WLAN AP — 602

The base station performs multi-stream aggregation data transmission with the UE using the WLAN AP and through an IP tunnel, where the IP tunnel is determined using the first IP address and the second IP address — 603

(51) Int. Cl.
*H04W 28/08* (2009.01)
*H04W 72/04* (2009.01)
*H04W 76/11* (2018.01)

(56) References Cited

U.S. PATENT DOCUMENTS

| | | | | |
|---|---|---|---|---|
| 2010/0299173 | A1* | 11/2010 | Zampiello | G06Q 30/0246 705/344 |
| 2011/0222523 | A1 | 9/2011 | Fu et al. | |
| 2013/0088983 | A1 | 4/2013 | Pragada et al. | |
| 2014/0029570 | A1 | 1/2014 | Lee et al. | |
| 2014/0071925 | A1 | 3/2014 | Liu | |
| 2014/0321376 | A1* | 10/2014 | Damnjanovic | H04W 72/1215 370/329 |
| 2015/0063091 | A1* | 3/2015 | Vesterinen | H04W 8/02 370/216 |
| 2015/0117357 | A1* | 4/2015 | Ozturk | H04W 28/0205 370/329 |
| 2015/0139184 | A1 | 5/2015 | Wang et al. | |
| 2015/0215809 | A1 | 7/2015 | He et al. | |
| 2015/0296415 | A1* | 10/2015 | Ling | H04L 69/08 370/329 |
| 2016/0234851 | A1* | 8/2016 | Zhang | H04W 28/08 |
| 2017/0303330 | A1* | 10/2017 | Cho | H04W 76/025 |

FOREIGN PATENT DOCUMENTS

| | | |
|---|---|---|
| CN | 103582011 A | 2/2014 |
| CN | 103686909 A | 3/2014 |
| EP | 2773141 A1 | 9/2014 |
| EP | 2811779 A1 | 12/2014 |
| JP | 2007180777 A | 7/2007 |
| JP | 20100187267 A | 8/2010 |
| JP | 2013522986 A | 6/2013 |
| WO | 2013176588 A1 | 11/2013 |
| WO | 2013185653 A1 | 12/2013 |
| WO | 2014040574 A1 | 3/2014 |

OTHER PUBLICATIONS

Foreign Communication From a Counterpart Application, Korean Application No. 10-2016-7033096, Korean Notice of Preliminary Rejection dated Oct. 25, 2017, 5 pages.
Machine Translation and Abstract of Chinese Publication No. CN103686909, Mar. 26, 2014, 8 pages.
Foreign Communication From a Counterpart Application, PCT Application No. PCT/CN2014/076520, English Translation of International Search Report dated Jan. 9, 2015, 2 pages.
Foreign Communication From a Counterpart Application, PCT Application No. PCT/CN2014/076520, English Translation of Written Opinion dated Jan. 9, 2015, 14 pages.
Foreign Communiation From a Counterpart Application, European Application No. 14890823.9, Extended European Search Report dated Mar. 27, 2017, 8 pages.
Foreign Communication From a Counterpart Application, Japanese Application No. 2016-565144, Japanese Notice of Allowance dated Dec. 12, 2017, 3 pages.
Foreign Communication From a Counterpart Application, Japanese Application No. 2016-565144, English Translation Of Japanese Notice of Allowance dated Dec. 12, 2017, 2 pages.

* cited by examiner

DATA TRANSMISSION METHOD AND DEVICE

CROSS-REFERENCE TO RELATED APPLICATIONS

This application is a continuation of International Application No. PCT/CN2014/076520, filed on Apr. 29, 2014, the disclosure of which is hereby incorporated by reference in its entirety.

TECHNICAL FIELD

Embodiments of the present disclosure relate to communications technologies, and in particular, to a data transmission method and a device.

BACKGROUND

With rapid development of smartphones, a communications module in a wireless local area network (WLAN) is integrated into more mobile communications terminals. On the other hand, as requirements of people for mobile broadband continuously increase, an existing (for example, a wireless cellular) communications system is under greater data traffic pressure.

A wireless cellular network has advantages such as wide coverage and a support for high-speed mobility but also has disadvantages such as a low data rate, a high price, and large transmit power, and is relatively suitable for scenarios such as a high-speed movement and an outdoor wide-range activity. However, a WLAN has advantages such as a high data rate, cost effectiveness, and small transmit power but also has disadvantages such as small coverage, and is relatively suitable for scenarios such as a relatively static scenario and an indoor small-range activity. In consideration of the advantages and the disadvantages of the wireless cellular network and those of the wireless local area network, a feasible method is to integrate wireless cellular technologies with WLAN technologies, and offload data traffic of the wireless cellular communications system using the WLAN in order to improve user experience and implement highly-efficient and cost-effective communication.

Currently, one communications technology is learnt, user equipment (UE) accesses an evolved packet core (EPC) using a base station, and establishes a packet data network (PDN) connection using a packet data network gateway (PDN-GW). Then the UE may access the EPC using, for example, a trusted WLAN access network (TWAN), and the TWAN may select a PDN-GW to establish a PDN connection in order to implement integration of the wireless cellular technologies and the WLAN technologies.

However, the technology cannot ensure service continuity, which greatly affects user experience.

SUMMARY

Embodiments of the present disclosure provide a data transmission method and a device in order to ensure service continuity and improve user experience as well as implementing offloading.

According to a first aspect, an embodiment of the present disclosure provides a data transmission method, including sending, by a base station, request information, an identifier of a WLAN access point (AP), and a first Internet Protocol (IP) address of the base station to user equipment, where the request information is used to request the user equipment to perform multi-stream aggregation data transmission to the base station using the WLAN AP, receiving, by the base station, a second IP address assigned by the WLAN AP to the user equipment and confirmation information that are sent by the user equipment, where the confirmation information is used to confirm that the user equipment performs multi-stream aggregation data transmission to the base station using the WLAN AP, and performing, by the base station, multi-stream aggregation data transmission to the user equipment using the WLAN AP and through the IP tunnel, where the IP tunnel is determined using the first IP address and the second IP address.

With reference to the first aspect, in a first possible implementation manner of the first aspect, the base station has a base station protocol stack, and the performing, by the base station, multi-stream aggregation data transmission to the user equipment using the WLAN AP and through the IP tunnel includes adding, by the base station, an IP header to a first protocol data unit generated at an aggregation layer in the base station protocol stack, and sending the first protocol data unit with the added IP header to the user equipment using the WLAN AP and through the IP tunnel, or receiving, by the base station, a second protocol data unit that is sent by the user equipment using the WLAN AP and through the IP tunnel, deleting an IP header of the second protocol data unit, and instructing an aggregation layer in the base station protocol stack to process the second protocol data unit whose IP header is deleted, where the IP header is added by the user equipment to the second protocol data unit generated at an aggregation layer in a user equipment protocol stack.

With reference to the first possible implementation manner of the first aspect, in a second possible implementation manner of the first aspect, adding, by the base station, an IP header to a first protocol data unit generated at an aggregation layer in the base station protocol stack, and sending the first protocol data unit with the added IP header to the user equipment using the WLAN AP and through the IP tunnel includes adding, by the base station, the IP header to the first protocol data unit generated at the aggregation layer in the base station protocol stack, and sending the first protocol data unit with the added IP header to the user equipment using the WLAN AP and through the IP tunnel, where the IP header includes radio bearer information that is corresponding to the first protocol data unit and added by the base station according to location information, and the radio bearer information is used by the user equipment to instruct an aggregation layer entity that is in a mapping relationship with the radio bearer information and in the user equipment protocol stack to process the first protocol data unit whose IP header is deleted, or receiving, by the base station, a second protocol data unit that is sent by the user equipment using the WLAN AP and through the IP tunnel, deleting an IP header of the second protocol data unit, and instructing an aggregation layer in the base station protocol stack to process the second protocol data unit whose IP header is deleted includes receiving, by the base station, the second protocol data unit that is sent by the user equipment using the WLAN AP and through the IP tunnel, obtaining, from the IP header of the second protocol data unit according to location information, radio bearer information corresponding to the second protocol data unit, deleting the IP header of the second protocol data unit, and instructing an aggregation layer entity that is in a mapping relationship with the radio bearer information and in the base station protocol stack to process the second protocol data unit whose IP header is deleted.

With reference to the second possible implementation manner of the first aspect, in a third possible implementation manner of the first aspect, the location information is sent by the base station to the user equipment, or agreed by the base station and the user equipment according to a communications protocol, and the location information is used to indicate a location of the radio bearer information in the IP header.

With reference to the second or the third possible implementation manner of the first aspect, in a fourth possible implementation manner of the first aspect, the radio bearer information includes a radio bearer identifier or a logical channel identifier.

With reference to the fourth possible implementation manner of the first aspect, in a fifth possible implementation manner of the first aspect, the IP header further includes priority information of a logical channel corresponding to the logical channel identifier, or priority information of a radio bearer corresponding to the radio bearer identifier.

With reference to any one of the second to the fifth possible implementation manners of the first aspect, in a sixth possible implementation manner of the first aspect, the aggregation layer in the base station protocol stack is used to split the first protocol data unit from a protocol data unit that is transmitted by the base station to the user equipment using a wireless cellular network, or converge the second protocol data unit whose IP header is deleted and a protocol data unit that is transmitted by the user equipment to the base station using a wireless cellular network.

With reference to any one of the second to the sixth possible implementation manners of the first aspect, in a seventh possible implementation manner of the first aspect, the aggregation layer includes any one of the following a Packet Data Convergence Protocol (PDCP) layer, a Media Access Control (MAC) layer, a Radio Link Control (RLC) layer, and an IP layer.

With reference to any one of the second to the seventh possible implementation manners of the first aspect, in an eighth possible implementation manner of the first aspect, the IP header of the first protocol data unit further includes a source IP address and a destination IP address, where the source IP address is the first IP address, and the destination IP address is the second IP address, or the IP header of the second protocol data unit further includes a source IP address and a destination IP address, where the source IP address is the second IP address, and the destination IP address is the first IP address.

With reference to any one of the first to the eighth possible implementation manners of the first aspect, in a ninth possible implementation manner of the first aspect, the method further includes performing, by the base station, integrity protection on the first protocol data unit with the added IP header.

According to a second aspect, an embodiment of the present disclosure provides a data transmission method, including receiving, by user equipment, request information, an identifier of a wireless local area network access point WLAN AP, and a first IP address of a base station that are sent by the base station, where the request information is used to request the user equipment to perform multi-stream aggregation data transmission to the base station using the WLAN AP, sending, by the user equipment, a second IP address assigned by the WLAN AP to the user equipment and confirmation information to the base station, where the confirmation information is used to confirm that the user equipment performs multi-stream aggregation data transmission to the base station using the WLAN AP, and performing, by the user equipment, multi-stream aggregation data transmission to the base station using the WLAN AP and through an IP tunnel, where the IP tunnel is determined using the first IP address and the second IP address.

With reference to the second aspect, in a first possible implementation manner of the second aspect, the user equipment has a user equipment protocol stack, and the performing, by the user equipment, multi-stream aggregation data transmission to the base station using the WLAN AP and through an IP tunnel includes receiving, by the user equipment, a first protocol data unit that is sent by the base station using the WLAN AP and through the IP tunnel, deleting an IP header of the first protocol data unit, and instructing an aggregation layer in the user equipment protocol stack to process the first protocol data unit whose IP header is deleted, where the IP header is added by the base station to the first protocol data unit generated at an aggregation layer in a base station protocol stack, or adding, by the user equipment, an IP header to a second protocol data unit generated at an aggregation layer in the user equipment protocol stack, and sending the second protocol data unit with the added IP header to the base station using the WLAN AP and through the IP tunnel.

With reference to the first possible implementation manner of the second aspect, in a second possible implementation manner of the second aspect, receiving, by the user equipment, a first protocol data unit that is sent by the base station using the WLAN AP and through the IP tunnel, deleting an IP header of the first protocol data unit, and instructing an aggregation layer in the user equipment protocol stack to process the first protocol data unit whose IP header is deleted includes receiving, by the user equipment, the first protocol data unit that is sent by the base station using the WLAN AP and through the IP tunnel, obtaining, from the IP header of the first protocol data unit according to location information, radio bearer information corresponding to the first protocol data unit, deleting the IP header of the first protocol data unit, and instructing an aggregation layer entity that is in a mapping relationship with the radio bearer information and in the user equipment protocol stack to process the first protocol data unit whose IP header is deleted, or adding, by the user equipment, an IP header to a second protocol data unit generated at an aggregation layer in the user equipment protocol stack, and sending the second protocol data unit with the added IP header to the base station using the WLAN AP and through the IP tunnel includes adding, by the user equipment, the IP header to the second protocol data unit generated at the aggregation layer in the user equipment protocol stack, and sending the second protocol data unit with the added IP header to the base station using the WLAN AP and through the IP tunnel, where the IP header includes radio bearer information that is corresponding to the second protocol data unit and added by the user equipment according to location information, and the radio bearer information is used by the base station to instruct an aggregation layer entity that is in a mapping relationship with the radio bearer information and in the base station protocol stack to process the second protocol data unit whose IP header is deleted.

With reference to the second possible implementation manner of the second aspect, in a third possible implementation manner of the second aspect, the location information is sent by the base station to the user equipment, or agreed by the base station and the user equipment according to a communications protocol, and the location information is used to indicate a location of the radio bearer information in the IP header.

With reference to the second or the third possible implementation manner of the second aspect, in a fourth possible implementation manner of the second aspect, the radio bearer information includes a radio bearer identifier or a logical channel identifier.

With reference to the fourth possible implementation manner of the second aspect, in a fifth possible implementation manner of the second aspect, the IP header further includes priority information of a logical channel corresponding to the logical channel identifier, or priority information of a radio bearer corresponding to the radio bearer identifier.

With reference to any one of the second to the fifth possible implementation manners of the second aspect, in a sixth possible implementation manner of the second aspect, the aggregation layer in the user equipment protocol stack is used to split the second protocol data unit from a protocol data unit that is transmitted by the user equipment to the base station using a wireless cellular network, or converge the first protocol data unit whose IP header is deleted and a protocol data unit that is transmitted by the base station to the user equipment using a wireless cellular network.

With reference to any one of the second to the sixth possible implementation manners of the second aspect, in a seventh possible implementation manner of the second aspect, the aggregation layer includes any one of the following a PDCP layer, a MAC layer, a RLC layer, and an IP layer.

With reference to any one of the second to the seventh possible implementation manners of the second aspect, in an eighth possible implementation manner of the second aspect, the IP header of the first protocol data unit further includes a source IP address and a destination IP address, where the source IP address is the first IP address, and the destination IP address is the second IP address, or the IP header of the second protocol data unit further includes a source IP address and a destination IP address, where the source IP address is the second IP address, and the destination IP address is the first IP address.

With reference to any one of the first to the eighth possible implementation manners of the second aspect, in a ninth possible implementation manner of the second aspect, the method further includes performing, by the user equipment, integrity protection on the second protocol data unit with the added IP header.

According to a third aspect, an embodiment of the present disclosure provides a base station, including a transmission unit configured to send request information, an identifier of a wireless local area network access point WLAN AP, and a first IP address of the base station to user equipment, where the request information is used to request the user equipment to perform multi-stream aggregation data transmission to the base station using the WLAN AP, a receiving unit configured to receive a second IP address assigned by the WLAN AP to the user equipment and confirmation information that are sent by the user equipment, where the confirmation information is used to confirm that the user equipment performs multi-stream aggregation data transmission to the base station using the WLAN AP, and a processing unit configured to perform multi-stream aggregation data transmission to the user equipment using the WLAN AP and through the IP tunnel, where the IP tunnel is determined using the first IP address and the second IP address.

With reference to the third aspect, in a first possible implementation manner of the third aspect, the base station further includes a base station protocol stack unit, and the processing unit is further configured to add an IP header to a first protocol data unit generated at an aggregation layer in the base station protocol stack unit, and the transmission unit is further configured to send the first protocol data unit with the added IP header to the user equipment using the WLAN AP and through the IP tunnel, or the receiving unit is further configured to receive a second protocol data unit that is sent by the user equipment using the WLAN AP and through the IP tunnel, and the processing unit is further configured to delete an IP header of the second protocol data unit, and instruct an aggregation layer in the base station protocol stack unit to process the second protocol data unit whose IP header is deleted, where the IP header is added by the user equipment to the second protocol data unit generated at an aggregation layer in a user equipment protocol stack.

With reference to the first possible implementation manner of the third aspect, in a second possible implementation manner of the third aspect, before the transmission unit sends the first protocol data unit with the added IP header to the user equipment using the WLAN AP and through the IP tunnel, the processing unit is further configured to add the IP header to the first protocol data unit generated at the aggregation layer in the base station protocol stack unit, where the IP header includes radio bearer information that is corresponding to the first protocol data unit and added by the processing unit according to location information, and the radio bearer information is used by the user equipment to instruct an aggregation layer entity that is in a mapping relationship with the radio bearer information and in the user equipment protocol stack to process the first protocol data unit whose IP header is deleted, or after the receiving unit receives the second protocol data unit that is sent by the user equipment using the WLAN AP and through the IP tunnel, the processing unit is further configured to obtain, from the IP header of the second protocol data unit according to location information, radio bearer information corresponding to the second protocol data unit, delete the IP header of the second protocol data unit, and instruct an aggregation layer entity that is in a mapping relationship with the radio bearer information and in the base station protocol stack unit to process the second protocol data unit whose IP header is deleted.

With reference to the second possible implementation manner of the third aspect, in a third possible implementation manner of the third aspect, the location information is used to indicate a location of the radio bearer information in the IP header, and the transmission unit is further configured to send the location information to the user equipment, or the processing unit is further configured to agree on the location information with the user equipment according to a communications protocol.

With reference to the second or the third possible implementation manner of the third aspect, in a fourth possible implementation manner of the third aspect, the radio bearer information includes a radio bearer identifier or a logical channel identifier.

With reference to the fourth possible implementation manner of the third aspect, in a fifth possible implementation manner of the third aspect, the IP header further includes priority information of a logical channel corresponding to the logical channel identifier, or priority information of a radio bearer corresponding to the radio bearer identifier.

With reference to any one of the second to the fifth possible implementation manners of the third aspect, in a sixth possible implementation manner of the third aspect, the aggregation layer in the base station protocol stack unit is used to split the first protocol data unit from a protocol data unit that is transmitted by the transmission unit to the user equipment using a wireless cellular network, or converge the second protocol data unit whose IP header is deleted and a protocol data unit that is transmitted by the user equipment to the receiving unit using a wireless cellular network.

With reference to any one of the second to the sixth possible implementation manners of the third aspect, in a seventh possible implementation manner of the third aspect, the aggregation layer includes any one of the following a PDCP layer, a MAC layer, a RLC layer, and an IP layer.

With reference to any one of the second to the seventh possible implementation manners of the third aspect, in an eighth possible implementation manner of the third aspect, the IP header of the first protocol data unit further includes a source IP address and a destination IP address, where the source IP address is the first IP address, and the destination IP address is the second IP address, or the IP header of the second protocol data unit further includes a source IP address and a destination IP address, where the source IP address is the second IP address, and the destination IP address is the first IP address.

With reference to any one of the first to the eighth possible implementation manners of the third aspect, in a ninth possible implementation manner of the third aspect, the processing unit is further configured to perform integrity protection on the first protocol data unit with the added IP header.

According to a fourth aspect, an embodiment of the present disclosure provides user equipment, including a receiving unit configured to receive request information, an identifier of a wireless local area network access point WLAN AP, and a first IP address of a base station that are sent by the base station, where the request information is used to request the user equipment to perform multi-stream aggregation data transmission to the base station using the WLAN AP, a transmission unit configured to send a second IP address assigned by the WLAN AP to the user equipment and confirmation information to the base station, where the confirmation information is used to confirm that the user equipment performs multi-stream aggregation data transmission to the base station using the WLAN AP, and a processing unit configured to perform multi-stream aggregation data transmission to the base station using the WLAN AP and through an IP tunnel, where the IP tunnel is determined using the first IP address and the second IP address.

With reference to the fourth aspect, in a first possible implementation manner of the fourth aspect, the user equipment further includes a user equipment protocol stack unit, and the receiving unit is further configured to receive a first protocol data unit that is sent by the base station using the WLAN AP and through the IP tunnel, and the processing unit is further configured to delete an IP header of the first protocol data unit, and instruct an aggregation layer in the user equipment protocol stack unit to process the first protocol data unit whose IP header is deleted, where the IP header is added by the base station to the first protocol data unit generated at an aggregation layer in a base station protocol stack, or the processing unit is further configured to add an IP header to a second protocol data unit generated at an aggregation layer in the user equipment protocol stack unit, and the transmission unit is further configured to send the second protocol data unit with the added IP header to the base station using the WLAN AP and through the IP tunnel.

With reference to the first possible implementation manner of the fourth aspect, in a second possible implementation manner of the fourth aspect, after the receiving unit receives the first protocol data unit that is sent by the base station using the WLAN AP and through the IP tunnel, the processing unit is further configured to obtain, from the IP header of the first protocol data unit according to location information, radio bearer information corresponding to the first protocol data unit, delete the IP header of the first protocol data unit, and instruct an aggregation layer entity that is in a mapping relationship with the radio bearer information and in the user equipment protocol stack unit to process the first protocol data unit whose IP header is deleted, or before the transmission unit sends the second protocol data unit with the added IP header to the base station using the WLAN AP and through the IP tunnel, the processing unit is further configured to add the IP header to the second protocol data unit generated at the aggregation layer in the user equipment protocol stack unit, where the IP header includes radio bearer information that is corresponding to the second protocol data unit and added by the user equipment according to location information, and the radio bearer information is used by the base station to instruct an aggregation layer entity that is in a mapping relationship with the radio bearer information and in the base station protocol stack to process the second protocol data unit whose IP header is deleted.

With reference to the second possible implementation manner of the fourth aspect, in a third possible implementation manner of the fourth aspect, the location information is used to indicate a location of the radio bearer information in the IP header, and the receiving unit is further configured to receive the location information sent by the base station, or the processing unit is further configured to agree on the location information with the base station according to a communications protocol.

With reference to the second or the third possible implementation manner of the fourth aspect, in a fourth possible implementation manner of the fourth aspect, the radio bearer information includes a radio bearer identifier or a logical channel identifier.

With reference to the fourth possible implementation manner of the fourth aspect, in a fifth possible implementation manner of the fourth aspect, the IP header further includes priority information of a logical channel corresponding to the logical channel identifier, or priority information of a radio bearer corresponding to the radio bearer identifier.

With reference to any one of the second to the fifth possible implementation manners of the fourth aspect, in a sixth possible implementation manner of the fourth aspect, the aggregation layer in the user equipment protocol stack unit is used to split the second protocol data unit from a protocol data unit that is transmitted by the transmission unit to the base station using a wireless cellular network, or converge the first protocol data unit whose IP header is deleted and a protocol data unit that is transmitted by the base station to the receiving unit using a wireless cellular network.

With reference to any one of the second to the sixth possible implementation manners of the fourth aspect, in a seventh possible implementation manner of the fourth aspect, the aggregation layer includes any one of the following a PDCP layer, a MAC layer, a RLC layer, and an IP layer.

With reference to any one of the second to the seventh possible implementation manners of the fourth aspect, in an eighth possible implementation manner of the fourth aspect, the IP header of the first protocol data unit further includes a source IP address and a destination IP address, where the source IP address is the first IP address, and the destination IP address is the second IP address, or the IP header of the second protocol data unit further includes a source IP address and a destination IP address, where the source IP address is the second IP address, and the destination IP address is the first IP address.

With reference to any one of the first to the eighth possible implementation manners of the fourth aspect, in a ninth possible implementation manner of the fourth aspect, the processing unit is further configured to perform integrity protection on the second protocol data unit with the added IP header.

According to a fifth aspect, an embodiment of the present disclosure provides a base station, including a network interface, a memory, a processor, and a bus, where the network interface, the memory, and the processor are separately connected to the bus, the processor invokes, using the bus, a program stored in the memory and is configured to send request information, an identifier of a WLAN AP, and a first IP address of the base station to user equipment using the network interface, where the request information is used to request the user equipment to perform multi-stream aggregation data transmission to the base station using the WLAN AP, receive, using the network interface, a second IP address assigned by the WLAN AP to the user equipment and confirmation information that are sent by the user equipment, where the confirmation information is used to confirm that the user equipment performs multi-stream aggregation data transmission to the base station using the WLAN AP, and perform, by the processor, multi-stream aggregation data transmission to the user equipment using the WLAN AP and through the IP tunnel, where the IP tunnel is determined using the first IP address and the second IP address.

With reference to the fifth aspect, in a first possible implementation manner of the fifth aspect, when the processor performs multi-stream aggregation data transmission to the user equipment using the WLAN AP and through the IP tunnel, the processor is further configured to add an IP header to a first protocol data unit generated according to an aggregation layer function of a base station protocol stack, and send the first protocol data unit with the added IP header to the user equipment using the WLAN AP, through the IP tunnel, and using the network interface, or receive, using the network interface, a second protocol data unit that is sent by the user equipment using the WLAN AP and through the IP tunnel, delete an IP header of the second protocol data unit, and process, according to an aggregation layer function of a base station protocol stack, the second protocol data unit whose IP header is deleted, where the IP header is added by the user equipment to the second protocol data unit generated according to an aggregation layer function of a user equipment protocol stack.

With reference to the first possible implementation manner of the fifth aspect, in a second possible implementation manner of the fifth aspect, when the processor performs multi-stream aggregation data transmission to the user equipment using the WLAN AP and through the IP tunnel, the processor is further configured to add an IP header to a first protocol data unit generated according to an aggregation layer function of a base station protocol stack, and send the first protocol data unit with the added IP header to the user equipment using the WLAN AP, through the IP tunnel, and using the network interface, where the IP header includes radio bearer information that is corresponding to the first protocol data unit and added by the processor according to location information, and the radio bearer information is used by the user equipment to process, according to an aggregation layer function of an aggregation layer entity that is in a mapping relationship with the radio bearer information and in a user equipment protocol stack, the first protocol data unit whose IP header is deleted, or receive, using the network interface, a second protocol data unit that is sent by the user equipment using the WLAN AP and through the IP tunnel, obtain, from an IP header of the second protocol data unit according to location information, radio bearer information corresponding to the second protocol data unit, delete the IP header of the second protocol data unit, and process, according to an aggregation layer function of an aggregation layer entity that is in a mapping relationship with the radio bearer information and in a base station protocol stack, the second protocol data unit whose IP header is deleted.

With reference to the second possible implementation manner of the fifth aspect, in a third possible implementation manner of the fifth aspect, the location information is used to indicate a location of the radio bearer information in the IP header, and the processor is further configured to send the location information to the user equipment using the network interface, or agree on the location information with the user equipment according to a communications protocol.

With reference to the second or the third possible implementation manner of the fifth aspect, in a fourth possible implementation manner of the fifth aspect, the radio bearer information includes a radio bearer identifier or a logical channel identifier.

With reference to the fourth possible implementation manner of the fifth aspect, in a fifth possible implementation manner of the fifth aspect, the IP header further includes priority information of a logical channel corresponding to the logical channel identifier, or priority information of a radio bearer corresponding to the radio bearer identifier.

With reference to any one of the second to the fifth possible implementation manners of the fifth aspect, in a sixth possible implementation manner of the fifth aspect, the processor is further configured to according to the aggregation layer function of the base station protocol stack, split the first protocol data unit from a protocol data unit that is transmitted by the transmission unit to the user equipment using a wireless cellular network, or converge the second protocol data unit whose IP header is deleted and a protocol data unit that is transmitted by the user equipment to the receiving unit using a wireless cellular network.

With reference to any one of the second to the sixth possible implementation manners of the fifth aspect, in a seventh possible implementation manner of the fifth aspect, the aggregation layer includes any one of the following a PDCP layer, a MAC layer, a RLC layer, and an IP layer.

With reference to any one of the second to the seventh possible implementation manners of the fifth aspect, in an eighth possible implementation manner of the fifth aspect, the IP header of the first protocol data unit further includes a source IP address and a destination IP address, where the source IP address is the first IP address, and the destination IP address is the second IP address, or the IP header of the second protocol data unit further includes a source IP address and a destination IP address, where the source IP address is the second IP address, and the destination IP address is the first IP address.

With reference to any one of the first to the eighth possible implementation manners of the fifth aspect, in a ninth possible implementation manner of the fifth aspect, the processor is further configured to perform integrity protection on the first protocol data unit with the added IP header.

According to a sixth aspect, an embodiment of the present disclosure provides user equipment, including a network interface, a memory, a processor, and a bus, where the network interface, the memory, and the processor are separately connected to the bus, the processor invokes, using the bus, a program stored in the memory and is configured to receive, using the network interface, request information, an identifier of a WLAN AP, and a first IP address of a base station that are sent by the base station, where the request information is used to request the user equipment to perform multi-stream aggregation data transmission to the base station using the WLAN AP, send a second IP address assigned by the WLAN AP to the user equipment and confirmation information to the base station using the network interface, where the confirmation information is used to confirm that the user equipment performs multi-stream aggregation data transmission to the base station using the WLAN AP, and perform, by the processor, multi-stream aggregation data transmission to the base station using the WLAN AP and through an IP tunnel, where the IP tunnel is determined using the first IP address and the second IP address.

With reference to the sixth aspect, in a first possible implementation manner of the sixth aspect, when the processor performs multi-stream aggregation data transmission to the base station using the WLAN AP and through the IP tunnel, the processor is further configured to receive, using the network interface, a first protocol data unit that is sent by the base station using the WLAN AP and through the IP tunnel, delete an IP header of the first protocol data unit, and process, according to an aggregation layer function of a user equipment protocol stack, the first protocol data unit whose IP header is deleted, where the IP header is added by the base station to the first protocol data unit generated according to an aggregation layer function of a base station protocol stack, or add an IP header to a second protocol data unit generated according to an aggregation layer function of a user equipment protocol stack, and send the second protocol data unit with the added IP header to the base station using the WLAN AP, through the IP tunnel, and using the network interface.

With reference to the first possible implementation manner of the sixth aspect, in a second possible implementation manner of the sixth aspect, when the processor performs multi-stream aggregation data transmission to the base station using the WLAN AP and through the IP tunnel, the processor is further configured to receive, using the network interface, a first protocol data unit that is sent by the base station using the WLAN AP and through the IP tunnel, obtain, from an IP header of the first protocol data unit according to location information, radio bearer information corresponding to the first protocol data unit, delete the IP header of the first protocol data unit, and process, according to an aggregation layer function of an aggregation layer entity that is in a mapping relationship with the radio bearer information and in a user equipment protocol stack, the first protocol data unit whose IP header is deleted, or add, by the processor, an IP header to a second protocol data unit generated according to an aggregation layer function of a user equipment protocol stack, and send the second protocol data unit with the added IP header to the base station using the WLAN AP, through the IP tunnel, and using the network interface, where the IP header includes radio bearer information that is corresponding to the second protocol data unit and added by the processor according to location information, and the radio bearer information is used by the base station to process, according to an aggregation layer function of an aggregation layer entity that is in a mapping relationship with the radio bearer information and in a base station protocol stack, the second protocol data unit whose IP header is deleted.

With reference to the second possible implementation manner of the sixth aspect, in a third possible implementation manner of the sixth aspect, the location information is used to indicate a location of the radio bearer information in the IP header, and the processor is further configured to receive, using the network interface, the location information sent by the base station, or agree on the location information with the user equipment according to a communications protocol.

With reference to the second or the third possible implementation manner of the sixth aspect, in a fourth possible implementation manner of the sixth aspect, the radio bearer information includes a radio bearer identifier or a logical channel identifier.

With reference to the fourth possible implementation manner of the sixth aspect, in a fifth possible implementation manner of the sixth aspect, the IP header further includes priority information of a logical channel corresponding to the logical channel identifier, or priority information of a radio bearer corresponding to the radio bearer identifier.

With reference to any one of the second to the fifth possible implementation manners of the sixth aspect, in a sixth possible implementation manner of the sixth aspect, the processor is further configured to split, according to the aggregation layer function of the user equipment protocol stack, the second protocol data unit from a protocol data unit that is transmitted by the transmission unit to the base station using a wireless cellular network, or converge the first protocol data unit whose IP header is deleted and a protocol data unit that is transmitted by the base station to the receiving unit using a wireless cellular network.

With reference to any one of the second to the sixth possible implementation manners of the sixth aspect, in a seventh possible implementation manner of the sixth aspect, the aggregation layer includes any one of the following a PDCP layer, a MAC layer, a RLC layer, and an IP layer.

With reference to any one of the second to the seventh possible implementation manners of the sixth aspect, in an eighth possible implementation manner of the sixth aspect, the IP header of the first protocol data unit further includes a source IP address and a destination IP address, where the source IP address is the first IP address, and the destination IP address is the second IP address, or the IP header of the second protocol data unit further includes a source IP address and a destination IP address, where the source IP address is the second IP address, and the destination IP address is the first IP address.

With reference to any one of the first to the eighth possible implementation manners of the sixth aspect, in a ninth possible implementation manner of the sixth aspect, the processor is further configured to perform integrity protection on the second protocol data unit with the added IP header.

The embodiments of the present disclosure provide a data transmission method and a device. In a data offloading process, a base station is used as a convergence point and a splitting point. The base station is sensitive to a quality change of a network link in a WLAN, which ensures service continuity, improves user experience, and avoids service discontinuity caused by insensitivity of an EPC to the quality change of the network link in the WLAN when the EPC is used as a convergence point and a splitting point.

BRIEF DESCRIPTION OF DRAWINGS

To describe the technical solutions in the embodiments of the present disclosure more clearly, the following briefly describes the accompanying drawings required for describing the embodiments or the prior art. The accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
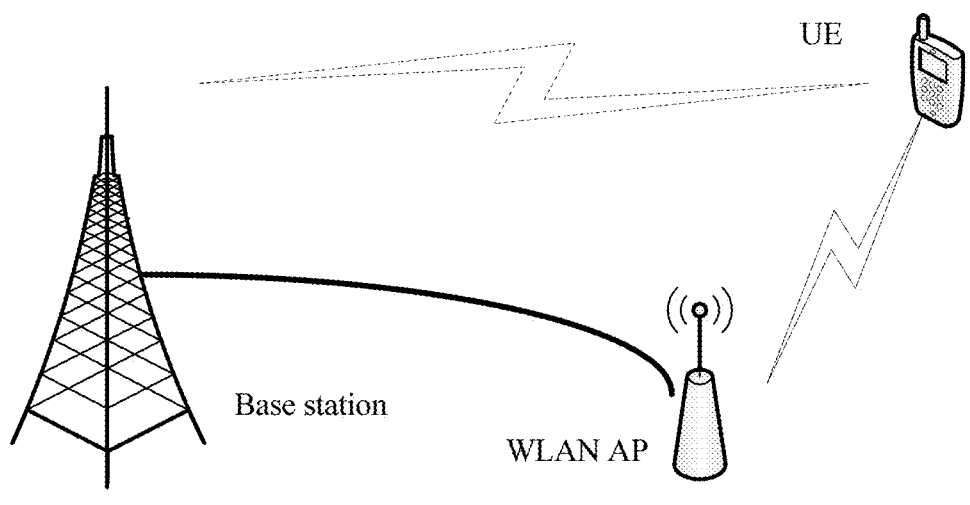
FIG. 1 is a schematic diagram of a data transmission scenario according to the present disclosure.

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

The technical solutions of the present disclosure may be applied to various communications systems in a wireless cellular network, such as a Global System for Mobile Communications (GSM) system, a Code Division Multiple Access (CDMA) system, a Wideband Code Division Multiple Access (WCDMA) system, a general packet radio service (GPRS) system, a Long Term Evolution (LTE) system, and Universal Mobile Telecommunications System (UMTS), which is not limited in the present disclosure.

In the embodiments of the present disclosure, UE, also referred to as a mobile terminal, mobile user equipment, and the like, may communicate with one or more core networks using a radio access network (RAN). The user equipment may be a mobile terminal, such as a mobile phone (or referred to as a "cellular" phone) and a computer with a mobile terminal, for example, may be a portable, pocket-sized, handheld, computer built-in, or in-vehicle mobile apparatus, which exchanges voice and/or data with the radio access network, which is not limited in the present disclosure.

A base station may be a base transceiver station (BTS) in GSM or CDMA, may be a NodeB in WCDMA, or may be an evolved NodeB (eNB or e-NodeB) in LTE, which is not limited in the present disclosure. The base station further includes a control node of various access network nodes, for example, a radio network controller (RNC) in UMTS or a controller that manages multiple small cells.

In the embodiments of the present disclosure, to offload data in a wireless cellular network, in a communications system of the present disclosure, a WLAN AP needs to be disposed, and the WLAN AP may be, for example, a WiFi AP, which is not limited in the present disclosure.

The WLAN AP in the embodiments of the present disclosure has two network architectures, a self-management architecture and a centralized management architecture. The self-management architecture is also referred to as a "fat" AP architecture. The WLAN AP is responsible for tasks such as user equipment access, a user equipment disconnection, permission authentication, security policy implementation, data forwarding, data encryption, and network management, and independently controls configuration and a wireless function that are of the WLAN AP. The centralized management architecture is also referred to as a "fit" AP architecture, and a management right is generally centralized on a radio controller (Access Controller (AC)). The AC manages an IP address of user equipment, authentication, encryption, and the like. The WLAN AP has only functions such as encryption, data forwarding, and a radio frequency function but cannot work independently. The Control and Provisioning of Wireless Access Points (CAPWAP) protocol is used between the WLAN AP and the AC. Optionally, the foregoing WLAN AP may be disposed with a base station together. Because the embodiments of the present disclosure mainly relate to the data forwarding function of the WLAN AP, both the two network architectures of the foregoing WLAN AP may be applied. For ease of understanding and description, the following uses the self-management architecture, that is, the "fat" AP architecture, as an example, which is not limited in the present disclosure.

FIG. 1 is a schematic diagram of a data transmission scenario according to the present disclosure. The scenario is about a multi-stream aggregation (MSA) communication manner in which traditional wireless cellular network communication between a base station and UE is integrated with WLAN communication between a WLAN AP and the UE to provide a high-speed and stable service to the user equipment. Communication between the base station and the WLAN AP is wired communication. As shown in FIG. 1, the base station may be used as a splitting point and a convergence point of data. When the base station determines to offload data of the UE using the WLAN AP, the data (including uplink data or downlink data) of the UE is transmitted using the WLAN AP and through an IP tunnel between the base station and the UE. For example, the IP tunnel is established between the base station and the UE, and data transmitted in the IP tunnel is routed between the base station and the UE using a wireless local area network. The process is described in detail in the following. The foregoing uplink data or downlink data may be a protocol data unit at a protocol layer in an air interface protocol stack of a wireless cellular network, which is not limited in the present disclosure.

The following describes the MSA scenario.

In this embodiment of the present disclosure, the downlink data transmitted by the base station to the UE (hereinafter referred to as downlink transmission) may include first-part downlink data and second-part downlink data. The base station offloads the first-part downlink data to the WLAN AP, and then the WLAN AP sends the first-part downlink data to the UE, the base station directly sends the second-part downlink data to the UE using the wireless cellular network. Therefore, both transmission capabilities of the wireless cellular network and the WLAN network can be used to achieve a higher downlink peak transmission rate of the UE.

The uplink data transmitted by the UE to the base station (hereinafter referred to as uplink transmission) may include first-part uplink data and second-part uplink data. The UE offloads the first-part uplink data to the WLAN AP, and then the WLAN AP sends the first-part uplink data to the base station, the UE directly sends the second-part uplink data to the base station using the wireless cellular network. Therefore, both the transmission capabilities of the wireless cellular network and the WLAN network can be used to achieve a higher uplink peak transmission rate of the UE.

During the downlink transmission, the base station may transmit, to the WLAN AP, data that needs to be offloaded, and the WLAN AP sends the data to the UE. During the uplink transmission, the UE may send, to the WLAN AP, data that needs to be offloaded, and the WLAN AP sends the data to the base station. Therefore, in this embodiment of the present disclosure, protocol stacks need to be configured in the base station and the WLAN AP to implement communication between the base station and the WLAN AP. Likewise, protocol stacks need to be configured in the UE and the WLAN AP to implement communication between the UE and the WLAN AP.

Figure 2:
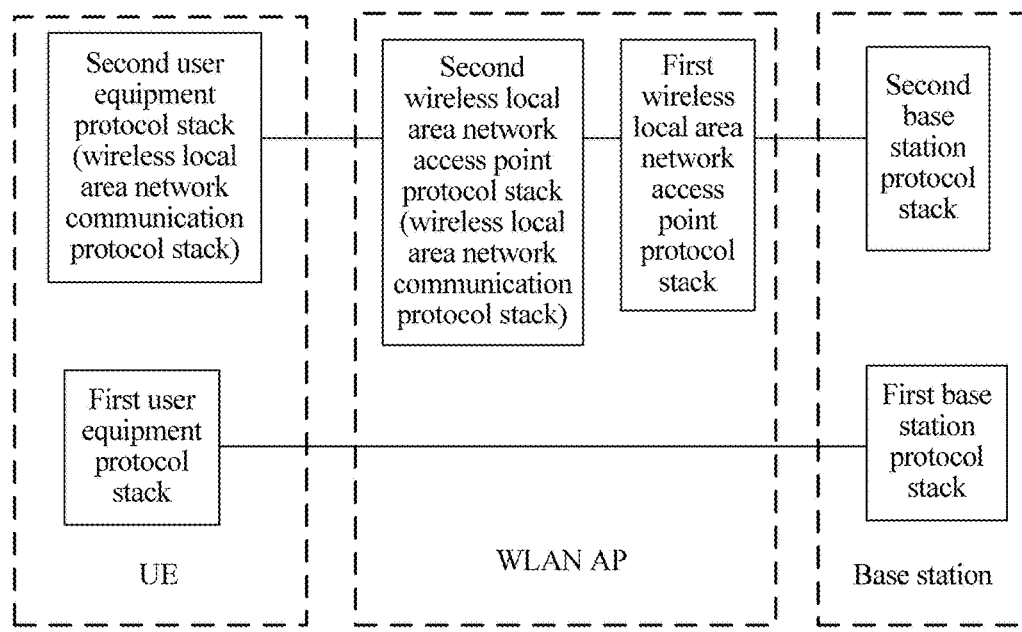
FIG. 2 is a schematic diagram that indicates communication relationships between protocol stacks in a base station, UE, and a WLAN AP according to an embodiment of the present disclosure.

FIG. 2 is a schematic diagram that indicates communication relationships between protocol stacks in a base station, UE, and a WLAN AP according to an embodiment of the present disclosure. As shown in FIG. 2, in this embodiment of the present disclosure, communication between the base station and the UE may be performed in a communication manner of using an IP tunnel (further, the base station and the UE transmit offloaded data using the WLAN AP).

A WLAN communication manner is used between the UE and the WLAN AP. A protocol stack that is used to implement the WLAN communication, for example, a WiFi protocol stack, may be set in the UE. Because the WLAN communication manner is used between the UE and the WLAN AP, a time-frequency resource used for the WLAN communication manner is different from a time-frequency resource used for wireless cellular network communication between the UE and the base station. Therefore, data transmitted between the base station and the UE can be offloaded.

A communication manner between the WLAN AP and the base station may be combined with a bottom-layer protocol, for example, a communication manner such as optical network transmission, Ethernet transmission, asymmetric digital subscriber line (ADSL), or microwave relay, to implement communication between the WLAN AP and the base station.

Figure 3:
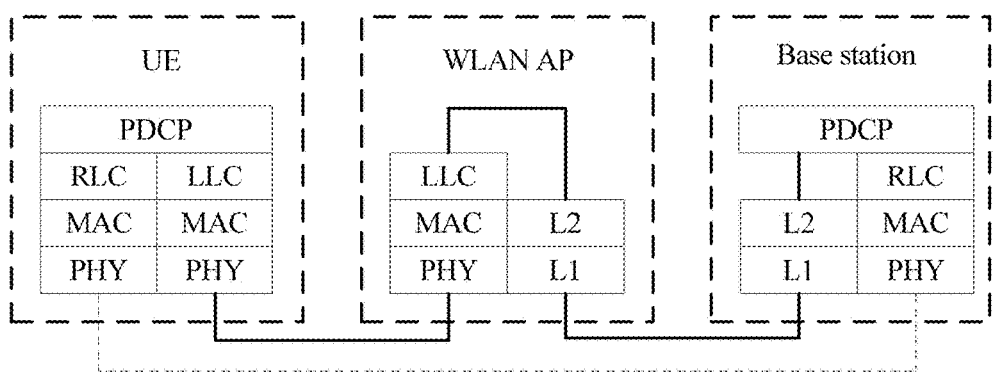
FIG. 3 is a schematic diagram that indicates configuration structures of a protocol stack in a base station, UE, and a WLAN AP according to an embodiment of the present disclosure.

As depicted in FIG. 3, FIG. 3 is a schematic diagram that indicates configuration structures of protocol stacks in a base station, UE, and a WLAN AP according to an embodiment of the present disclosure. The following separately describes the configuration structures of the protocol stacks in the base station, the WLAN AP, and the UE.

The following describes the configuration structure of the protocol stack in the base station.

Optionally, the base station has a base station protocol stack. In this embodiment of the present disclosure, the base station protocol stack may include a first base station protocol stack and a second base station protocol stack. The first base station protocol stack is used to implement data processing of communication between the base station and the user equipment on a base station side. The second base station protocol stack is used to implement data processing of communication between the base station and the WLAN AP on the base station side.

It should be understood that the first base station protocol stack is described only as an example, and the present disclosure is not limited thereto. Another protocol stack that can implement communication between the base station and the user equipment on the base station (or an access network node) side falls within the protection scope of the present disclosure. In addition, communication between the foregoing base station and the user equipment includes communication between the user equipment and an access network node that can perform functions of a base station. For example, a protocol stack that can implement communication between a relay node (RN) and the UE also falls within the protection scope of the present disclosure.

A communication manner such as optical network transmission, Ethernet transmission, ADSL, or microwave relay may be used for the second base station protocol stack. It should be understood that the foregoing communication manner is described only as an example, and the present disclosure is not limited thereto. Another protocol stack that can implement communication between the WLAN AP and the base station on the base station side falls within the protection scope of the present disclosure. The second base station protocol stack may be directly connected to at least one protocol layer in the first base station protocol stack using an internal interface, which is not limited in the present disclosure.

In this embodiment of the present disclosure, the first base station protocol stack or the second base station protocol stack may include a user plane protocol stack, or may include a user plane protocol stack and a control plane protocol stack, which is not further limited in the present disclosure. The following uses an example in which the first base station protocol stack or the second base station protocol stack is a user plane protocol stack for description.

As shown in FIG. 3, in this embodiment of the present disclosure, as an example instead of a limitation, the first base station protocol stack may include the following protocol layers, a PDCP layer, a RLC layer, a MAC layer, and a physical (PHY) layer. The PDCP layer is mainly used to compress, decompress, encrypt, and decrypt information. The RLC layer is mainly used to implement a function related to an automatic repeat request (ARQ), and segment and concatenate information or reassemble segmented and concatenated information. The MAC layer is mainly used to select a transmission format combination and implement functions related to scheduling and a hybrid automatic repeat request (HARQ). The PHY layer is mainly used to provide an information transmission service to the MAC layer and an upper layer, and perform coding and modulation processing or demodulation and decoding processing according to the selected transmission format combination.

It should be noted that in an example of this embodiment, the second base station protocol stack is connected to the PDCP layer in the first base station protocol stack, which is not limited in the present disclosure. That is, in this embodiment of the present disclosure, the second base station protocol stack may be connected to any protocol layer in the PDCP layer, the RLC layer, or the MAC layer in the foregoing first base station protocol stack, or even an IP layer above the PDCP layer. In this embodiment, for ease of description, a protocol layer that is in the first base station protocol stack and connected to the second base station protocol stack is referred to as an aggregation layer. The aggregation layer in the base station protocol stack in this embodiment has functions of converging data and splitting data. For example, the aggregation layer may be used to converge uplink data that is transmitted by the user equipment to the base station using the WLAN AP, and uplink data that is transmitted to the base station using a wireless cellular network, or used to perform splitting, the aggregation layer may be used to split downlink data that is transmitted by the base station to the user equipment using the WLAN AP, from downlink data that is transmitted to the user equipment using the wireless cellular network. In this embodiment of the present disclosure, the aggregation layer may be the PDCP layer, the RLC layer, the MAC layer, or the IP layer. In this embodiment of the present disclosure, when the aggregation layer is the PDCP layer, the RLC layer, the MAC layer, or the IP layer, a corresponding aggregation layer entity may be a PDCP entity, an RLC entity, a MAC entity, or an IP entity.

The aggregation layer in the first base station protocol stack is used as an example in the following.

In an uplink transmission process, the aggregation layer in the first base station protocol stack is used to converge first-part uplink data that is sent by the UE using the WLAN AP, and second-part uplink data that is sent by the UE to the base station using the wireless cellular network. In a downlink transmission process, the aggregation layer in the first base station protocol stack is used to split data generated at the aggregation layer into first-part downlink data and second-part downlink data, the base station processes the first-part downlink data, then sends the processed data to the UE using the WLAN AP, and sends the second-part downlink data to the UE using the wireless cellular network. Details are described in the following.

In an example, the base station obtains data from a core network and sends the data to the user equipment. The base station may be connected to the core network using an S1 interface. In addition, the base station may obtain the data from the core network using the S1 interface, and then process the data in descending order of the protocol layers in the first base station protocol stack until the data is processed at the aggregation layer in the first base station protocol stack. The base station adds an IP header of an IP tunnel to first-part downlink data output after processing at the aggregation layer, and then delivers the first-part downlink data with the added IP header to the second base station protocol stack for processing. The second base station protocol stack sends the processed first-part downlink data to the WLAN AP such that the WLAN AP can send the first-part downlink data to the UE in a WLAN communication manner. The first base station protocol stack may further send second-part downlink data to the UE using the wireless cellular network. The UE converges, at an aggregation layer in a first user equipment protocol stack, the first-part downlink data and the second-part downlink data that is directly received from the cellular network, and delivers, to an upper layer of the aggregation layer in the first user equipment protocol stack (if the aggregation layer is not the uppermost layer in the first user equipment protocol stack), the data obtained after processing such as reordering is performed on the two parts of the data. In an example, the first base station protocol stack or the first user equipment protocol stack is an LTE protocol stack, and the PHY/MAC/RLC/PDCP layers are sequentially in ascending order. For the first-part downlink data, for example, when the aggregation layer is the PDCP layer, the base station obtains the downlink data from the S1 interface, then generates the first-part downlink data using the PDCP layer, and delivers the first-part downlink data with the added IP header to the second base station protocol stack for processing such that the second base station protocol stack offloads the first-part downlink data to the WLAN AP. When the aggregation layer is the RLC layer, the base station obtains the downlink data from the S1 interface, then processes the downlink data using the PDCP layer, and sends the processed data to the RLC layer. At the RLC layer, the first-part downlink data is generated, and the first-part downlink data with the added IP header is delivered to the second base station protocol stack for processing such that the second base station protocol stack offloads the data to the WLAN AP.

In an example, the base station receives data sent by the UE and sends the data to the core network. The base station may be connected to the core network using the S1 interface. The WLAN AP may receive, in a wireless local area network communication manner, first-part uplink data that is with an added IP header and sent by the UE. Then the WLAN AP may send the first-part uplink data with the added IP header to the base station using a communications protocol between the WLAN AP and the base station. The base station converges, at the aggregation layer in the first base station protocol stack, the first-part uplink data whose IP header is deleted and second-part uplink data that is sent by the UE and directly received from the wireless cellular network, and delivers, to an upper layer of the aggregation layer in the first base station protocol stack (if the aggregation layer is not the uppermost layer in the first base station protocol stack), the data obtained after processing such as reordering is performed on the two parts of the data. Then at the upper layer, the processed data is sent to the core network using the S1 interface. In an example, for the first-part uplink data, the first base station protocol stack is an LTE protocol stack, and the PHY/MAC/RLC/PDCP layers are sequentially in ascending order. When the aggregation layer is the PDCP layer, the first-part uplink data and the second-part uplink data that is directly received from the wireless cellular network are converged at the PDCP layer. After processing, the base station sends the processed data to the core network using the S1 interface. When the aggregation layer is the RLC layer, at the RLC layer, the first-part uplink data and the second-part uplink data that is directly received from the wireless cellular network are converged and processed and then delivered to the PDCP layer. After processing at the PDCP layer, the base station sends the processed data to the core network using the S1 interface.

The following describes the configuration structure of the protocol stack in the WLAN AP.

Optionally, the WLAN AP has a WLAN AP protocol stack. In this embodiment, the WLAN AP protocol stack may include a first WLAN AP protocol stack and a second WLAN AP protocol stack. The first WLAN AP protocol stack is used to implement data processing of communication between the WLAN AP and the base station on the WLAN AP side. The second WLAN AP protocol stack is used to implement data processing of communication between the WLAN AP and the UE on the WLAN AP side.

A communication manner such as optical network transmission, Ethernet transmission, ADSL, or microwave relay may be used for the first WLAN AP protocol stack. It should be understood that the foregoing communication manner is described only as an example, and the present disclosure is not limited thereto. Another protocol stack that can implement communication between the WLAN AP and the base station on the WLAN AP side falls within the protection scope of the present disclosure. In addition, in this embodiment of the present disclosure, the first WLAN AP protocol stack may include a user plane protocol stack, or may include a user plane protocol stack and a control plane protocol stack, which is not limited in the present disclosure. The following uses an example in which the first WLAN AP protocol stack is a user plane protocol stack for description.

The second WLAN AP protocol stack may be a protocol stack that is used to implement the wireless local area network communication, for example, a WiFi protocol stack. It should be understood that the WiFi protocol stack is described only as an example, and the present disclosure is not limited thereto. Another protocol stack that can implement communication between the WLAN AP and the UE on the WLAN AP side falls within the protection scope of the present disclosure.

As shown in FIG. 3, in this embodiment of the present disclosure, as an example instead of a limitation, the WiFi protocol stack may include a logical link control (LLC) layer, a MAC layer, a PHY layer. Main functions of the LLC layer are transmission reliability assurance and control, data packet segmentation and reassembly, and sequential transmission of data packets. Main functions of the MAC layer are to provide reliable data transmission on an unreliable medium to a user and provide a distributed coordination function, a centralized access control mechanism, an encryption service, listening and avoiding, power control, and the like. Main functions of the PHY layer are to execute a physical layer convergence procedure to map a data block to a proper physical frame format and perform coding and modulation processing, demodulation and decoding processing, or the like.

In an example, the WLAN AP obtains data from the base station and sends the data to the user equipment. The WLAN AP may obtain, using the first WLAN AP protocol stack, data that the base station needs to send to the UE. Then the WLAN AP may send the data to the UE in a WLAN communication manner. The process is described in detail in the following.

In an example, the WLAN AP obtains data from the UE and sends the data to the base station. The WLAN AP may obtain, in a WLAN communication manner, data that the UE needs to send to the base station. Then the WLAN AP may send the data to the base station using the first WLAN AP protocol stack. The process is described in detail in the following.

The following describes the configuration structure of the protocol stack in the UE.

Optionally, the UE has a UE protocol stack. In this embodiment, the UE protocol stack includes a first UE protocol stack and a second UE protocol stack. The first UE protocol stack is used to implement data processing of communication between the UE and the base station on the UE side. The second UE protocol stack is used to implement data processing of communication between the UE and the WLAN AP on the UE side. The second UE protocol stack is connected to at least one protocol layer in the first UE protocol stack.

It should be understood that the first UE protocol stack is described only as an example, and the present disclosure is not limited thereto. Another protocol stack that can implement communication between the base station and the UE falls within the protection scope of the present disclosure on the UE side. In addition, communication between the foregoing base station and the UE includes communication between the UE and an access network node that can perform functions of a base station. For example, a UE protocol stack that can implement communication between a RN and the UE also falls within the protection scope of the present disclosure.

As shown in FIG. 3, as an example instead of a limitation, the foregoing first UE protocol stack may include the following protocol layers a PDCP layer, a RLC layer, a MAC layer, and a PHY layer. The PDCP layer is mainly used to compress and decompress/encrypt and decrypt information. The RLC layer is mainly used to implement a function related to an ARQ, and segment and concatenate information or reassemble segmented and concatenated information. The MAC layer is mainly used to select a transmission format combination and implement functions related to scheduling and an HARQ. The PHY layer is mainly used to provide an information transmission service to the MAC layer and an upper layer, and perform coding and modulation processing or demodulation and decoding processing according to the selected transmission format combination.

The second UE protocol stack may be a protocol stack that is used to implement WLAN communication, for example, a WiFi protocol stack. It should be understood that the WiFi protocol stack is described only as an example, and the present disclosure is not limited thereto. Another protocol stack that can implement communication between the WLAN AP and the UE on the UE side falls within the protection scope of the present disclosure.

As shown in FIG. 3, in this embodiment of the present disclosure, as an example instead of a limitation, the WiFi protocol stack may include an LLC layer, a MAC layer, a PHY layer. Main functions of the LLC layer are transmission reliability assurance and control, data packet segmentation and reassembly, and sequential transmission of data packets. Main functions of the MAC layer are to provide reliable data transmission on an unreliable medium to a user and provide a distributed coordination function, a centralized access control mechanism, an encryption service, listening and avoiding, power control, and the like. Main functions of the PHY layer are to execute a PHY layer convergence procedure to map a data block to a proper physical frame format and perform coding and modulation processing, demodulation and decoding processing, or the like.

It should be noted that, in an example of this embodiment, the second UE protocol stack is connected to the PDCP layer in the first UE protocol stack, which is not limited in the present disclosure. That is, in this embodiment of the present disclosure, the second UE protocol stack may be connected to any protocol layer in the PDCP layer, the RLC layer, or the MAC layer in the foregoing first UE protocol stack, or even an IP layer above the PDCP layer. In this embodiment, for ease of description, a protocol layer that is in the first UE protocol stack and connected to the second UE protocol stack is referred to as an aggregation layer in the UE protocol stack. The aggregation layer in the UE protocol stack in this embodiment has functions of converging data and splitting data. For example, the aggregation layer may be used to converge downlink data that is transmitted by the base station to the UE using the WLAN AP, and downlink data that is transmitted to the UE using the wireless cellular network, or used to perform splitting, the aggregation layer may be used to split uplink data that is transmitted by the UE to the base station using the WLAN AP, from uplink data that is transmitted to the base station using the wireless cellular network. In this embodiment, the aggregation layer may be the PDCP layer, the RLC layer, the MAC layer, or the IP layer. In this embodiment of the present disclosure, when the aggregation layer is the PDCP layer, the RLC layer, the MAC layer, or the IP layer, a corresponding aggregation layer entity may be a PDCP entity, an RLC entity, a MAC entity, or an IP entity.

The aggregation layer in the first UE protocol stack is used as an example in the following.

In an uplink transmission process, the aggregation layer in the first UE protocol stack is used to split data generated at the aggregation layer into first-part uplink data and second-part uplink data. The UE processes the first-part uplink data, then sends the processed data to the UE using the WLAN AP, and sends the second-part uplink data to the base station using the wireless cellular network. During downlink transmission, the aggregation layer in the first UE protocol stack is used to converge first-part downlink data that is sent by the base station using the WLAN AP and second-part downlink data that is sent by the base station using the wireless cellular network. Details are described in the following.

In an example, the UE sends data to the base station using the WLAN AP. The UE may process the data in descending order of the protocol layers in the first UE protocol stack until the data is processed at the aggregation layer in the first UE. The UE adds an IP header of an IP tunnel to first-part uplink data output after processing at the aggregation layer, and then delivers the first-part uplink data to the second UE protocol stack for processing. The second UE protocol stack sends the processed data to the WLAN AP such that the WLAN AP sends the first-part uplink data to the base station. Optionally, the UE sends, to the base station using the wireless cellular network, second-part uplink data output after processing at the aggregation layer. The base station converges, at the aggregation layer in the first base station protocol stack, the first-part uplink data and the second-part uplink data that is directly received from the wireless cellular network, processes the first-part uplink data and the second-part uplink data, and delivers the processed data to an upper layer of the aggregation layer in the first base station protocol stack (if the aggregation layer is not the uppermost layer in the first base station protocol stack). A specific embodiment is similar to that for the base station side, and details are not described herein in this embodiment.

In an example, the UE receives data that is sent by the base station using the WLAN AP. The UE may receive, in a WLAN communication manner, first-part downlink data sent by the WLAN AP. The UE converges, at the aggregation layer in the first UE protocol stack, the first-part downlink data whose IP header is deleted and second-part downlink data that is directly received from the wireless cellular network, and then delivers the converged data to an upper layer of the aggregation layer in the first UE protocol stack (if the aggregation layer is not the uppermost layer in the first base station protocol stack). A specific embodiment is similar to that for the base station side, and details are not described herein in this embodiment.

The following separately describes in detail actions of data transmission performed by the base station and the UE according to a data transmission method in the embodiments of the present disclosure. To make a description about the data transmission method in the following clearer and more comprehensible, some concepts related to the method are first described as follows.

Protocol data unit: in a communications system, data transmitted between two adjacent protocol layers is referred to as a protocol data unit of an upper layer in the adjacent protocol layers. An LTE protocol stack is used as an example. Data that is obtained after processing such as header compression and encryption is performed at a PDCP layer and that is delivered to an RLC layer is referred to as a PDCP protocol data unit. On the contrary, a data unit that is delivered to the PDCP layer and obtained after data that is delivered from a MAC layer and received at the RLC layer undergoes data segmentation, reassembly, and reordering is also referred to as a PDCP protocol data unit. For ease of differentiation and for ease of detailed description of an offloading process using the WLAN AP, on the base station side, a first-part downlink protocol data unit output at the aggregation layer in the first base station protocol stack is referred to as a first protocol data unit, on the UE side, a first-part uplink protocol data unit output at the aggregation layer in the first UE protocol stack is referred to as a second protocol data unit.

IP header: the IP header may include a source address, a destination address, and radio bearer information.

In this embodiment of the present disclosure, when the IP header is added to the protocol data unit, the source address and the destination address may be used to determine the IP tunnel between the UE and the base station. Therefore, the protocol data unit with the added IP header may be transmitted in the IP tunnel determined using the source address and the destination address.

In this embodiment of the present disclosure, the radio bearer information is used to indicate a radio bearer to which a protocol data unit belongs. For each radio bearer, one aggregation layer entity may be generated at the aggregation layer to be responsible for processing of the radio bearer at the aggregation layer, and the aggregation layer entity completes a function defined for the aggregation layer. For example, the aggregation layer entity may complete a function, which is defined for the aggregation layer, of converging data and splitting data.

The radio bearer information may include a radio bearer identifier or a logical channel identifier.

Optionally, when the radio bearer information is a logical channel identifier, because a logical channel is in a mapping relationship with a radio bearer, an IP tunnel receive end (for example, during uplink transmission, the IP tunnel receive end is a base station, during downlink transmission, the IP tunnel receive end is UE) may learn a radio bearer identifier according to the logical channel identifier. In an example, the aggregation layer is the PDCP layer. A radio bearer corresponding to the radio bearer identifier is corresponding to or in a mapping relationship with the PDCP layer. Further, the radio bearer is in a one-to-one correspondence with a PDCP entity at the PDCP layer. That is, each PDCP entity is corresponding to one radio bearer, and a quantity of PDCP entities is determined using a quantity of established radio bearers.

Location information: used to indicate a location of radio bearer information, corresponding to a protocol data unit of an aggregation layer, in an IP header.

In a specific implementation process, location information of radio bearer information in an IP header may be pre-agreed by the UE and the base station according to a communications protocol (for example, the UE may obtain the location information in a manner agreed according to the protocol), or may be sent by the base station to the UE.

Optionally, for an IP header of the first protocol data unit, the location information is used to indicate a location of first radio bearer information, corresponding to the first protocol data unit, in the IP header of the first protocol data unit. The first radio bearer information is used to indicate a radio bearer to which the first protocol data unit belongs and includes a first radio bearer identifier or a first logical channel identifier. The UE may learn the first radio bearer identifier according to the first logical channel identifier when the first radio bearer information is the first logical channel identifier, because a logical channel is in a mapping relationship with a radio bearer.

Optionally, for an IP header of the second protocol data unit, the location information is used to indicate a location of second radio bearer information, corresponding to the second protocol data unit, in the IP header of the second protocol data unit. The second radio bearer information is used to indicate a radio bearer to which the second protocol data unit belongs and includes a second radio bearer identifier or a second logical channel identifier. The base station may learn the second radio bearer identifier according to the second logical channel identifier when the second radio bearer information is the second logical channel identifier, because a logical channel is in a mapping relationship with a radio bearer.

Optionally, the IP header may further include priority information of a logical channel corresponding to the logical channel identifier, or priority information of a radio bearer corresponding to the radio bearer identifier. In this embodiment, the priority information may be indicated by a differentiated services code point (DSCP). The DSCP may be located in a type of service (TOS) byte in the IP header. For example, a priority order of data transmission may be differentiated using coded values using six bits.

Further, assuming that the WLAN AP supports quality of service (QoS) transmission in a data transmission process performed using the WiFi protocol stack, the UE that also supports QoS negotiates with the WLAN AP about a QoS parameter when accessing the WLAN. Optionally, the UE may report, to the base station, whether the WLAN AP supports the QoS transmission.

When the WLAN AP supports QoS downlink transmission, the base station fills in a DSCP in the IP header according to a priority of the logical channel or a priority of the radio bearer in which the first protocol data unit is located. A mapping relationship between the DSCP value and the priority of the radio bearer or that of the logical channel may be pre-agreed according to a protocol. In the WiFi protocol stack in the WLAN AP, the DSCP value in the IP header is in a mapping relationship with a user priority of the MAC layer in the WiFi protocol stack. After receiving the first protocol data unit sent by the base station, the WLAN AP puts, according to the DSCP value in the IP header, the first protocol data unit into a send buffer corresponding to the user priority. Data in send buffers with different user priorities has different scheduling priorities.

When the WLAN AP supports QoS uplink transmission, the UE fills in a DSCP in the IP header according to a priority of the radio bearer or a priority of the logical channel in which the second protocol data unit is located. A mapping relationship between the DSCP value and the priority of the radio bearer or that of the logical channel may be pre-agreed according to a protocol. In the WiFi protocol stack in the WLAN AP, the DSCP value in the IP header is in a mapping relationship with a user priority of the MAC layer in the WiFi protocol stack. After receiving the second protocol data unit sent by the UE, the WLAN AP puts, according to the DSCP value in the IP header, the second protocol data unit into a send buffer corresponding to the user priority. Data in send buffers with different user priorities has different scheduling priorities.

Figure 4:
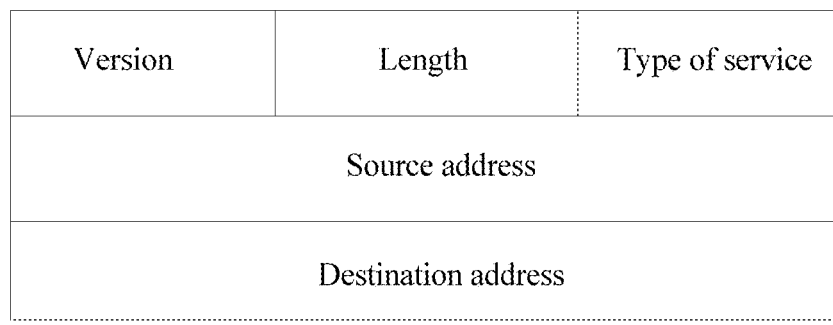
FIG. 4 is a schematic diagram of an Internet Protocol version 4 (IPV4) header according to an embodiment of the present disclosure.

For example, the IP header is an IPV4 header. FIG. 4 is a schematic diagram of an IPV4 header according to an embodiment of the present disclosure. The IPV4 header may include a source address, a destination address, radio bearer information, and a DSCP. The radio bearer information may be agreed according to a protocol or sent by a base station and is located in a field, such as "version," "length," or "type of service," in the IP header. The DSCP may be located in the TOS field in the IP header. The IPV4 is used to identify a version number of a used IP protocol.

Figure 5:
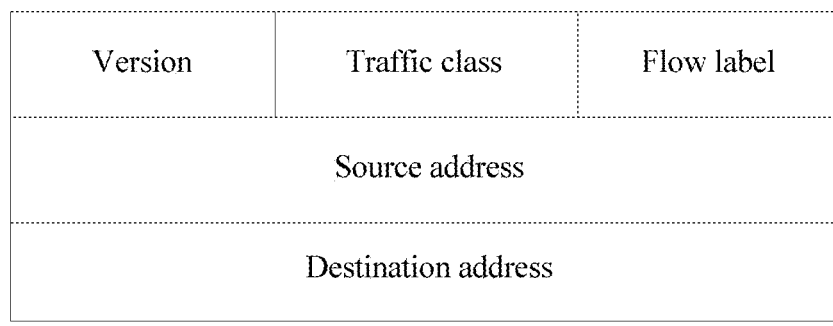
FIG. 5 is a schematic diagram of an Internet Protocol version 6 (IPV6) header according to an embodiment of the present disclosure.

The IP header is an IPV6 header. FIG. 5 is a schematic diagram of an IPV6 header according to an embodiment of the present disclosure. The IPV6 header may include a source address, a destination address, radio bearer information, and a DSCP. The radio bearer information is located in a field, such as "version" or "flow label," in the IP header. The DSCP may be located in a traffic class field in the IP header. The IPV6 is used to identify a version number of a used IP protocol.

Optionally, to ensure QoS of a radio bearer, the following processing may be further performed on downlink data and uplink data.

Because the downlink data may be directly transmitted to the UE using the wireless cellular network, or may be transmitted to the UE using the WLAN AP network, when QoS of some data packets in first-part downlink data transmitted using the WLAN network cannot meet a requirement, the QoS of the radio bearer may be ensured using a mechanism, for example, using a secondary WLAN AP, or switching the data packets in the first-part downlink data to the wireless cellular network, or reducing a data volume of downlink data that is offloaded to the WLAN AP.

Because the uplink data may be directly transmitted to the base station using the wireless cellular network, or may be transmitted to the base station using the WLAN network, when QoS of some data packets in first-part uplink data transmitted using the WLAN network cannot meet a requirement, the QoS of the radio bearer may be ensured using a mechanism, for example, using a secondary WLAN AP, or switching the data packets in the first-part uplink data to the wireless cellular network, or reducing a data volume of uplink data that is offloaded to the WLAN AP.

Figure 6:
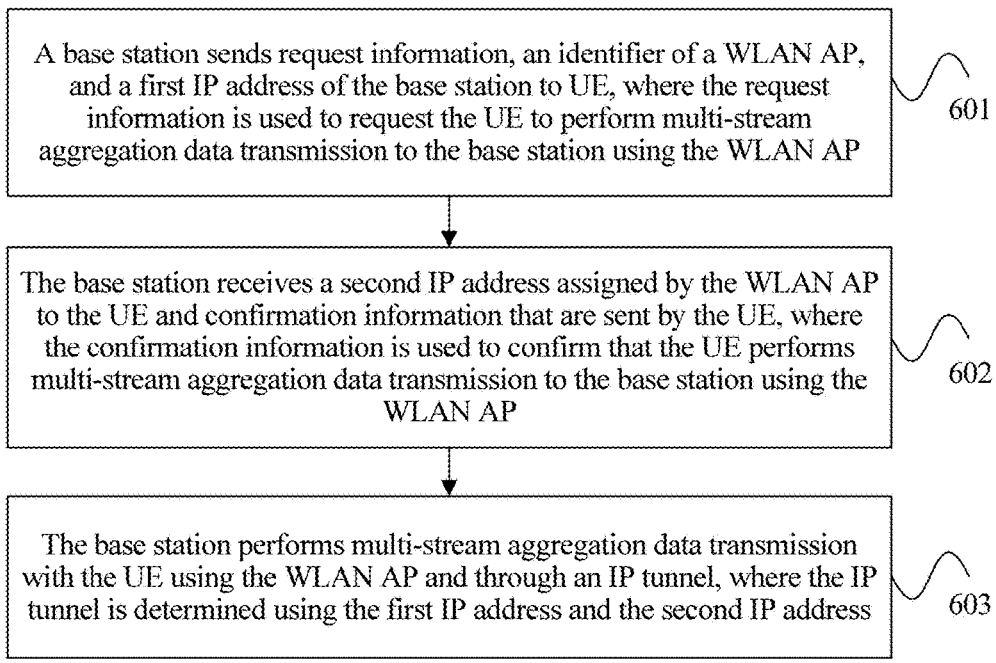
FIG. 6 shows a schematic flowchart of a data transmission method according to an embodiment of the present disclosure.

FIG. 6 shows a schematic flowchart of a data transmission method according to an embodiment of the present disclosure. The method is executed by a base station in a communications system. The communications system further includes a WLAN AP and UE, and an IP tunnel is set between the base station and the UE using the WLAN AP. The method includes the following steps.

Step 601: The base station sends request information, an identifier of the WLAN AP, and a first IP address of the base station to the UE, where the request information is used to request the UE to perform multi-stream aggregation data transmission to the base station using the WLAN AP.

Step 602: The base station receives a second IP address assigned by the WLAN AP to the UE and confirmation information that are sent by the UE, where the confirmation information is used to confirm that the UE performs multi-stream aggregation data transmission to the base station using the WLAN AP.

Step 603: The base station performs multi-stream aggregation data transmission to the UE using the WLAN AP and through an IP tunnel, where the IP tunnel is determined using the first IP address and the second IP address.

Optionally, when the base station determines to perform offloading using the WLAN AP, the base station sends the request information, the identifier of the WLAN AP, and the first IP address of the base station to the UE. For determining to perform offloading by the base station using the WLAN AP, the following possible implementation manners are included.

In a possible implementation manner, the base station instructs, according to subscription information of the UE, the UE to perform measurement on the WLAN AP and report a measurement result to the base station. Then the base station determines, according to the measurement result (for example, the UE finds, by means of measurement, that a WiFi network corresponding to the WLAN AP has a relatively strong signal), to perform offloading using the WLAN AP.

In another possible implementation manner, the base station determines, according to network load and distribution of the WLAN AP (for example, the WLAN AP is distributed in an area with relatively heavy network load), to perform offloading using the WLAN AP.

Optionally, the request information, the identifier of the WLAN AP, and the first IP address of the base station that are sent by the base station to the UE may be carried in various messages that are sent by the base station to the UE. In a specific implementation process, the request information, the identifier of the WLAN AP, and the first IP address of the base station may be carried in a same message, or the request information, the identifier of the WLAN AP, and the first IP address of the base station may be carried in multiple messages. In this embodiment of the present disclosure, no limitation is set on a quantity and a type of messages that carry the foregoing request information, the identifier of the WLAN AP, and the first IP address of the base station, and no limitation is set on an order of sending the foregoing different messages.

Optionally, the foregoing identifier of the WLAN AP may be a basic service set identifier (BSSID) or a service set identifier (SSID) of the WLAN AP.

It should be understood that a basic service set (BSS) is a basic component of a WLAN network and generally includes an AP and multiple workstations (STA). An extended service set (ESS) includes multiple BSSs. Each BSS has a unique identifier (ID), that is, a BSS ID or a BSS identifier. Because the BSS generally has an AP, the BSS identifier is generally an identifier of the AP, for example, may be a MAC address of the AP.

It should be further understood that for the WLAN network, a network-side serving device is an AP, and a user-side terminal device is a STA, and for a wireless cellular network, a network-side serving device is a base station, and a user-side terminal device is UE. In a heterogeneous network scenario formed by the WLAN and the wireless cellular network in this embodiment of the present disclosure, the user-side terminal device may be referred to as UE or a STA and can receive services of the two networks. For ease of description, user-side terminal devices are collectively referred to as UE.

Optionally, the UE sends an authentication request to the WLAN AP according to the identifier of the WLAN AP. After having been authenticated, the UE sends, to the base station, the confirmation information and the second IP address assigned by the WLAN AP to the UE.

In step 602, the second IP address that is sent by the UE to the base station is an IP address that is assigned by the WLAN AP and that is used for multi-stream aggregation. For example, for uplink data that is sent by the UE to the WLAN AP, the WLAN AP delivers, to the base station for convergence, the data sent by the UE at the second IP address. For another example, for downlink data that is sent by the base station to the WLAN AP, the WLAN AP transmits, to the UE for convergence, the data that is sent by the base station and whose destination address is the second IP address.

In step 603, multi-stream aggregation data transmission that is performed by the base station with the UE using the WLAN AP and through the IP tunnel may include uplink data transmission and downlink data transmission. For ease of explanation and description, uplink data and downlink data are collectively referred to as a protocol data unit in the following, which is not limited in the present disclosure.

Optionally, in the downlink transmission process in this embodiment of the present disclosure, the base station adds an IP header to a first protocol data unit generated at an aggregation layer in a base station protocol stack, and sends the first protocol data unit with the added IP header to the UE using the WLAN AP and through the IP tunnel. The base station protocol stack may be a first base station protocol stack.

Optionally, in the IP header added to the first protocol data unit, a source address is the first IP address, and a destination address is the second IP address.

Optionally, the foregoing IP header includes radio bearer information that is corresponding to the first protocol data unit and added by the base station according to location information. The radio bearer information is used by the UE to instruct an aggregation layer entity that is in a mapping relationship with the radio bearer information and in a UE protocol stack to process the first protocol data unit whose IP header is deleted. In this embodiment of the present disclosure, the aggregation layer may include an aggregation layer entity. The aggregation layer entity is in a one-to-one correspondence with the radio bearer information or is corresponding to a specified logical channel. Therefore, the radio bearer information may be used to instruct the aggregation layer entity that is in a mapping relationship with the radio bearer information and in the UE protocol stack to process the first protocol data unit whose IP header is deleted.

In a specific implementation process, the base station sends the first protocol data unit with the added IP header to the WLAN AP. After receiving the first protocol data unit with the added IP header, the WLAN AP obtains the destination address in the IP header, that is, the second IP address assigned by the WLAN AP to the UE. Because the second IP address is in a mapping relationship with an address of the UE, the WLAN AP may determine the address such as a MAC address of the UE according to the second IP address, and send the first protocol data unit to the UE using a WiFi protocol. Therefore, the WLAN AP only needs to perform processing according to a WiFi protocol stack, without needing to perform special processing on the first protocol data unit with the added IP header, and the WLAN AP does not need to be improved either. The foregoing special processing may be understood as processing performed by the WLAN AP on the first protocol data unit with the added IP header when the protocol stack in the WLAN AP changes, for example, the WiFi protocol stack is not used, which includes but is not limited to mapping, conversion, and the like and is different from a processing manner of the WiFi protocol stack, or processing that needs to be performed by the WLAN AP on the first protocol data unit with the added IP header according to an instruction agreed by the WLAN AP and the base station.

Optionally, during the uplink transmission in this embodiment of the present disclosure, the base station receives, through the IP tunnel, a second protocol data unit that is sent by the UE using the WLAN AP, deletes an IP header of the second protocol data unit, and instructs an aggregation layer in a base station protocol stack to process the second protocol data unit whose IP header is deleted, where the IP header is added by the UE to the second protocol data unit generated at an aggregation layer in a UE protocol stack. The base station protocol stack may be a first base station protocol stack.

Optionally, in the IP header of the second protocol data unit, a source address is the second IP address, and a destination address is the first IP address.

Optionally, after receiving, through the IP tunnel, the second protocol data unit that is sent by the UE using the WLAN AP, the base station obtains, from the IP header of the second protocol data unit according to location information, radio bearer information corresponding to the second protocol data unit, deletes the IP header of the second protocol data unit, and instructs an aggregation layer entity that is in a mapping relationship with the radio bearer information and in the base station protocol stack to process the second protocol data unit whose IP header is deleted. In this embodiment of the present disclosure, the aggregation layer may include an aggregation layer entity. The aggregation layer entity is in a one-to-one correspondence with the radio bearer information or is corresponding to a specified logical channel. Therefore, the radio bearer information may be used to instruct the aggregation layer entity that is in a mapping relationship with the radio bearer information and in the base station protocol stack to process the first protocol data unit whose IP header is deleted.

In a specific implementation process, the UE sends the second protocol data unit with the added IP header to the WLAN AP. After receiving the second protocol data unit with the added IP header, the WLAN AP may directly forward the second protocol data unit to the base station according to the destination address in the IP header, that is, the first IP address of the base station that is sent by the base station to the UE. The WLAN AP does not need to process the second protocol data unit with the added IP header, and the WLAN AP does not need to be improved either.

Optionally, the base station performs differentiation processing on a protocol data unit offloaded to the WLAN AP. In a manner, when a destination address in an IP header of data that is sent by the WLAN AP to the base station is not the first IP address of the base station, the base station transmits the data to the Internet, for example, transmits the data to a router or any server that is indicated by the destination address. The foregoing data may be WiFi only data or signaling such as WiFi authentication. In another manner, when a destination address in an IP header of data that is sent by the WLAN AP to the base station is the first IP address of the base station, the base station deletes the IP header of the data and instructs the aggregation layer in the base station protocol stack to process the data whose IP header is deleted.

Optionally, the aggregation layer in the foregoing base station protocol stack is used to split the first protocol data unit from a protocol data unit that is transmitted by the base station to the UE using the wireless cellular network, or converge the second protocol data unit whose IP header is deleted and a protocol data unit that is transmitted by the UE to the base station using the wireless cellular network.

According to the data transmission method provided in this embodiment of the present disclosure, a base station is used as a convergence point and a splitting point. The base station is sensitive to a quality change of a network link in a WLAN, which ensures service continuity, improves user experience, and avoids service discontinuity caused by insensitivity of an EPC to the quality change of the network link in the WLAN when the EPC is used as a convergence point and a splitting point.

Figure 7:
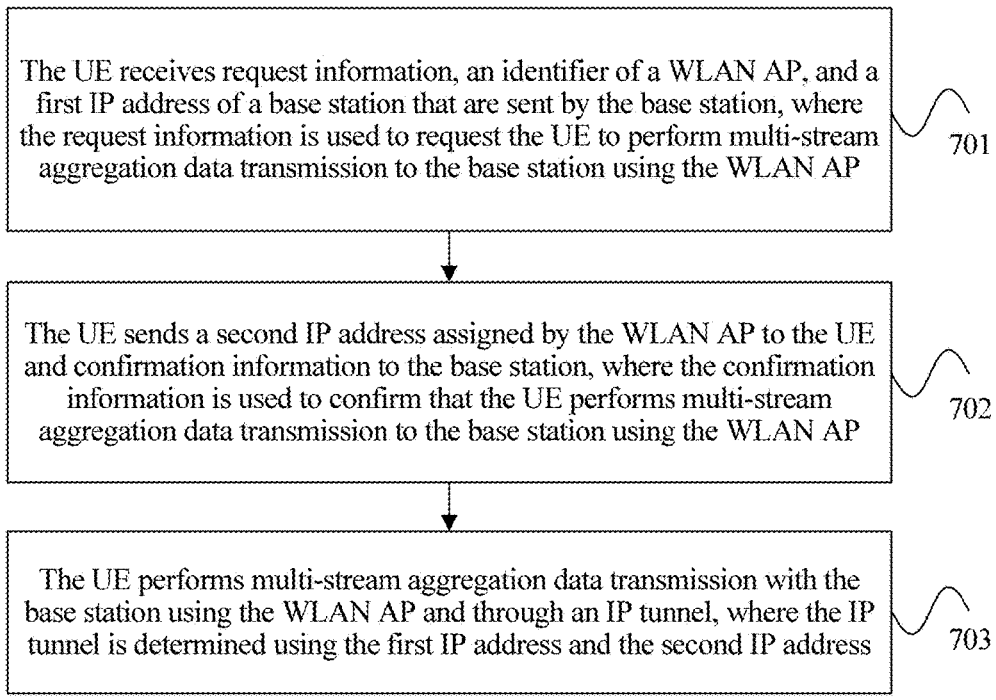
FIG. 7 shows a schematic flowchart of a data transmission method according to another embodiment of the present disclosure.

FIG. 7 shows a schematic flowchart of a data transmission method according to another embodiment of the present disclosure. The method is executed by UE in a communications system. The communications system further includes a base station and a WLAN AP, and an IP tunnel is set between the base station and the UE using the WLAN AP. The method includes the following steps.

Step 701: The UE receives request information, an identifier of the WLAN AP, and a first IP address of the base station that are sent by the base station, where the request information is used to request the UE to perform multi-stream aggregation data transmission to the base station using the WLAN AP.

Step 702: The UE sends a second IP address assigned by the WLAN AP to the UE and confirmation information to the base station, where the confirmation information is used to confirm that the UE performs multi-stream aggregation data transmission to the base station using the WLAN AP.

Step 703: The UE performs multi-stream aggregation data transmission to the base station using the WLAN AP and through an IP tunnel, where the IP tunnel is determined using the first IP address and the second IP address.

Optionally, after receiving the request information, the identifier of the WLAN AP, and the first IP address of the base station that are sent by the base station, the UE accesses the WLAN AP according to a communications protocol. The UE first discovers the WLAN AP corresponding to the identifier of the WLAN AP in a manner of listening to a beacon frame or sending a probe frame, and accesses the WLAN AP. A manner in which the UE accesses the WLAN AP may be, for example, performing processes such as authentication and association with the WLAN AP to complete authentication, which is not limited in the present disclosure.

In a specific implementation process, after the base station sends the request information to the UE, and the UE sends the confirmation information to the base station, if the UE has uplink data to be sent to the base station, that is, a second protocol data unit in this embodiment, the UE sends the second protocol data unit with an added IP header to the WLAN AP.

After receiving the second protocol data unit with the added IP header, the WLAN AP directly forwards the second protocol data unit to the base station according to a destination address in the IP header, that is, the first IP address of the base station that is sent by the base station to the UE. The WLAN AP does not need to perform special processing on the second protocol data unit with the added IP header (that is, the second protocol data unit is processed as a common IP packet), and the WLAN AP does not need to be improved either.

In this embodiment, all costs generated in communication of the UE in a wireless cellular network and a WLAN are calculated by the base station or a core network device in a mobile communications network. However, if authentication is performed on the UE using an authentication server, the authentication server may also calculate the costs generated by the UE in a wireless communication process. The authentication server is an important component in the wireless communications system, and may be further referred to as an Authentication, Authorization, Accounting (designated as AAA) server, for example, having a server program that may be used to process an access request of a user. Main functions of the authentication server are, for example, managing which user can access the WLAN network or obtain an access right, which service can be obtained by a user who has the access right, and how to charge a user who uses a network resource.

Therefore, repeated charging by the authentication server may be avoided in the following manners.

In a first manner, simultaneous authentication of equals (SAE) or Pre-shared Key (PSK) authentication is performed between the UE and the WLAN AP. For the SAE or PSK authentication, the base station obtains an initial key in a manner such as operation, administration and maintenance (OAM), and notifies the UE of the initial key. Authentication and key derivation between the UE and the WLAN AP are performed using the initial key, that is, authentication can be implemented without needing to interact with the authentication server.

In a second manner, Extensible Authentication Protocol-Authentication and Key Agreement (EAP-AKA) authentication is performed between the UE and the WLAN AP, and the authentication is implemented using the authentication server. In this case, when the base station or the UE determines to perform offloading using the WLAN AP, the base station or the UE instructs the authentication server not to charge the costs generated by the UE in the wireless communication process. For example, the base station or the UE sends an instruction message to the authentication server. The instruction message includes an identifier of the UE and is used to instruct the authentication server not to charge the costs generated by the UE corresponding to the identifier of the UE in the wireless communication process.

In a third manner, the base station plays a role of the authentication server, that is, the base station has functions of the authentication server. In addition, EAP-AKA authentication is performed between the UE and the base station.

Optionally, in a downlink transmission process in this embodiment of the present disclosure, after receiving a first protocol data unit that is sent by the base station using the WLAN AP and through the IP tunnel, the UE deletes an IP header of the first protocol data unit, and instructs an aggregation layer in a UE protocol stack to process the first protocol data unit whose IP header is deleted, where the IP header is added by the base station to the protocol data unit generated at an aggregation layer in a base station protocol stack. The UE protocol stack may be a first UE protocol stack.

Optionally, in the IP header added to the first protocol data unit, a source address is the first IP address, and a destination address is the second IP address.

Optionally, the UE receives the first protocol data unit that is sent by the base station using the WLAN AP and through the IP tunnel, obtains, from the IP header of the first protocol data unit according to location information, radio bearer information corresponding to the first protocol data unit, deletes the IP header of the first protocol data unit, and instructs an aggregation layer entity that is in a mapping relationship with the radio bearer information and in the UE protocol stack to process the first protocol data unit whose IP header is deleted. In this embodiment of the present disclosure, the aggregation layer may include an aggregation layer entity. The aggregation layer entity is in a one-to-one correspondence with the radio bearer information or is corresponding to a specified logical channel. Therefore, the radio bearer information may be used to instruct the aggregation layer entity that is in a mapping relationship with the radio bearer information and in the UE protocol stack to process the first protocol data unit whose IP header is deleted.

In a specific implementation process, the base station sends the first protocol data unit with the added IP header to the WLAN AP using the IP tunnel. After receiving the first protocol data unit with the added IP header, the WLAN AP determines a MAC address of the UE according to the destination address in the IP header, that is, the second IP address assigned by the WLAN AP to the UE, and offloads the first protocol data unit with the added IP header to the UE using a WiFi protocol. Therefore, the WLAN AP does not need to perform special processing on the first protocol data unit with the added IP header, and the WLAN AP does not need to be improved either.

After receiving the first protocol data unit that is with the added IP header and offloaded by the WLAN AP, the UE deletes the IP header of the first protocol data unit, and instructs the aggregation layer in the first UE protocol stack to process the first protocol data unit whose IP header is deleted. Optionally, the UE performs differentiation processing on data offloaded by the WLAN AP. For data whose destination IP address is not the second IP address of the UE, the UE does not deliver the data to the aggregation layer in the first UE protocol stack for processing.

Optionally, in an uplink transmission process in this embodiment of the present disclosure, the UE adds the IP header to the second protocol data unit generated at an aggregation layer in a UE protocol stack, and sends the second protocol data unit with the added IP header to the base station using the WLAN AP and through the IP tunnel.

Optionally, in the IP header added to the second protocol data unit, a source address is the second IP address, and the destination address is the first IP address.

Optionally, the foregoing IP header includes radio bearer information that is corresponding to the second protocol data unit and added by the UE according to location information. The radio bearer information is used by the base station to instruct an aggregation layer entity that is in a mapping relationship with the radio bearer information and in a base station protocol stack to process the second protocol data unit whose IP header is deleted. In this embodiment of the present disclosure, the aggregation layer may include an aggregation layer entity. The aggregation layer entity is in a one-to-one correspondence with the radio bearer information or is corresponding to a specified logical channel. Therefore, the radio bearer information may be used to instruct the aggregation layer entity that is in a mapping relationship with the radio bearer information and in the base station protocol stack to process the second protocol data unit whose IP header is deleted.

Optionally, the aggregation layer in the foregoing UE protocol stack is used to split the second protocol data unit from a protocol data unit that is transmitted by the UE to the base station using the wireless cellular network, or converge the first protocol data unit whose IP header is deleted and a protocol data unit that is transmitted by the base station to the UE using the wireless cellular network.

According to the data transmission method provided in this embodiment of the present disclosure, in a data offloading process, a base station is used as a convergence point and a splitting point. The base station is sensitive to a quality change of a network link in a WLAN, which ensures service continuity, improves user experience, and avoids service discontinuity caused by insensitivity of an EPC to the quality change of the network link in the WLAN when the EPC is used as a convergence point and a splitting point.

The following uses an example in which a PDCP layer is an aggregation layer, to describe in detail the embodiments shown in FIG. 6 and FIG. 7 with reference to the protocol stack shown in FIG. 3.

The following mainly describes a transmission process in which the base station offloads downlink data to the UE using the WLAN AP and through the IP tunnel.

The base station adds an IP header to a first protocol data unit of a PDCP layer in a first base station protocol stack. The IP header includes first radio bearer information that is corresponding to the first protocol data unit and added by the base station according to location information. In the IP header, a source address is the first IP address, and a destination address is the second IP address. Then the base station transmits the first protocol data unit with the added IP header to an L1 layer in a first WLAN AP protocol stack in the WLAN AP using an L2 layer and an L1 layer in a second base station protocol stack. Then the first protocol data unit with the added IP header is restored after processing at the L1 layer and an L2 layer in the first WLAN AP protocol stack, and delivered to a second WLAN AP protocol stack for processing.

The second WLAN AP protocol stack adds an LLC header to the obtained first protocol data unit with the added IP header to implement functions such as traffic control, and determines, according to the destination address in the IP header, whether the destination address is the second IP address assigned by the WLAN AP to the UE. When the destination address is the second IP address, a MAC header is further added to the foregoing first protocol data unit with the added IP header using a MAC layer in the second WLAN AP, to implement functions such as scheduling, addressing, and QoS. A MAC protocol data unit (MPDU) is generated, and then is transmitted to a PHY layer in a second UE protocol stack in the UE using a PHY layer in the second WLAN AP protocol stack.

After the foregoing MPDU is received at the PHY layer in the second UE protocol stack in the UE, the MAC header and the LLC header are successively deleted using a MAC layer and an LLC layer in the second UE protocol stack, to obtain the first protocol data unit with the added IP header. Then the UE determines, according to the source IP address in the IP header, whether the first protocol data unit is data transmitted from the first IP address of the base station, that is, whether the first protocol data unit is data transmitted through the IP tunnel. When determining that the foregoing first protocol data unit is data transmitted through the IP tunnel, the UE deletes the IP header of the first protocol data unit, obtains, from the IP header of the first protocol data unit according to the location information, the first radio bearer information corresponding to the first protocol data unit, and instructs a PDCP entity that is corresponding to the first radio bearer information and in the PDCP layer in the first UE protocol stack to process the first protocol data unit whose IP header is deleted.

The following mainly describes a transmission process in which the UE offloads uplink data to the base station using the WLAN AP and through the IP tunnel.

The UE adds an IP header to a second protocol data unit of a PDCP layer in the first UE protocol stack. The IP header includes second radio bearer information that is corresponding to the second protocol data unit and added by the UE according to location information. In the IP header, a source address is the second IP address, and a destination address is the first IP address. Then a second UE protocol stack in the UE adds an LLC header to the first protocol data unit with the added IP header. At a MAC layer in the second UE protocol stack in the UE, a MAC header is added to the second protocol data unit according to the destination address in the IP header, and a MPDU is generated. Then the MAC protocol data unit is transmitted to a PHY layer in a second WLAN AP protocol stack in the WLAN AP using a PHY layer in the second UE protocol stack.

After the foregoing MPDU is received at the PHY layer in the second WLAN AP protocol stack in the WLAN AP, the MAC header and the LLC header are successively deleted using a MAC layer and an LLC layer in the second WLAN AP protocol stack, to obtain the second protocol data unit with the added IP header. Then the WLAN AP transmits the second protocol data unit with the added IP header to an L1 layer and an L2 layer in a second base station protocol stack in the base station using an L2 layer and an L1 layer in a first WLAN AP protocol stack. Then the base station determines, according to the source IP address in the IP header, whether the second protocol data unit with the added IP header is data transmitted from the second IP address, that is, whether the second protocol data unit with the added IP header is data transmitted through the IP tunnel. When determining that the second protocol data unit with the added IP header is data transmitted through the IP tunnel, the base station deletes the IP header, obtains, from the IP header according to the location information, the second radio bearer information corresponding to the second protocol data unit, and instructs a PDCP entity that is corresponding to the second radio bearer information and in a PDCP layer in a first base station protocol stack to process the second protocol data unit whose IP header is deleted.

In this embodiment of the present disclosure, the data transmission method further includes performing, by the base station, integrity protection on the first protocol data unit with the added IP header.

In a specific implementation process, because the UE discloses the second IP address, the UE side is prone to an external attack. For example, a hacker pretends to be the base station and sends a large amount of data to the UE through the IP tunnel, which causes wireless cellular network congestion. Therefore, the base station needs to perform integrity protection on the data offloaded using the WLAN AP such that the UE side is free from the external attack.

In the downlink transmission process, the base station performs integrity protection on the first protocol data unit using an integrity protection key. Optionally, the integrity protection key may be a key used to perform integrity protection on radio resource control (RRC) signaling of a wireless cellular network and is used to perform integrity protection on the first protocol data unit offloaded using the WLAN AP. Further, after adding the IP header to the first protocol data unit, the base station calculates message authentication code for integrity (MAC-I) for the first protocol data unit with the added IP header according to the integrity protection key, and attaches the MAC-I to a location following the first protocol data unit with the added IP header to perform integrity protection on the first protocol data unit. Then the base station sends, to the UE using the WLAN AP, the first protocol data unit that is with the added IP header and on which integrity protection is performed. After receiving the first protocol data unit that is with the added IP header and on which integrity protection is performed, the UE calculates a check value to perform integrity verification. If the calculated check value is corresponding to the received MAC-I, integrity protection is successful, and the UE considers that the first protocol data unit with the added IP header is the data sent by the base station, deletes the IP header, and then delivers the first protocol data unit to the aggregation layer in the first UE protocol stack for processing. Alternatively, the base station may perform integrity protection, using another integrity protection key, on the first protocol data unit offloaded using the WLAN AP, which may require the base station to notify the UE of the integrity protection key in advance so that the UE can perform integrity verification.

In this embodiment of the present disclosure, integrity protection is performed to ensure data transmission security and prevent UE from being exposed to an external attack.

In this embodiment of the present disclosure, the data transmission method further includes performing, by the UE, integrity protection on the second protocol data unit with the added IP header.

In a specific implementation process, because the base station discloses the first IP address of the base station, the base station side is prone to an external attack. For example, a hacker pretends to be the UE and sends a large amount of data to the base station through the IP tunnel, which causes serious wireless cellular network congestion. Therefore, the UE needs to perform integrity protection on the data offloaded using the WLAN AP.

In the uplink transmission process, the UE performs integrity protection on the second protocol data unit using an integrity protection key. Optionally, the integrity protection key may be a key used to perform integrity protection on RRC signaling of a wireless cellular network and is used to perform integrity protection on the uplink data offloading using the WLAN AP.

Further, after adding the IP header to the second protocol data unit, the UE calculates MAC-I for the second protocol data unit with the added IP header according to the integrity protection key, and attaches the MAC-I to a location following the second protocol data unit with the added IP header to perform integrity protection on the second protocol data unit. Then the UE sends, to the base station using the WLAN AP, the second protocol data unit that is with the added IP header and on which integrity protection is performed. After receiving the second protocol data unit that is with the added IP header and on which integrity protection is performed, the base station calculates a check value to perform integrity verification. If the calculated check value is corresponding to the received MAC-I, integrity protection is successful, and the base station considers that the second protocol data unit with the added IP header is the data sent by the UE, deletes the IP header, and then delivers the second protocol data unit to the aggregation layer in the first base station protocol stack for processing. Alternatively, the UE may perform integrity protection on the uplink data offloaded using the WLAN AP using another integrity protection key. An implementation manner is that the base station notifies the UE of the other integrity protection key in advance.

In this embodiment of the present disclosure, integrity protection is performed to ensure data transmission security and prevent a base station from being exposed to an external attack.

It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

The foregoing describes in detail the offloading method in the embodiments of the present disclosure with reference to FIG. 1 to FIG. 7, and the following describes the UE and the base station in the embodiments of the present disclosure with reference to FIG. 8, FIG. 9, FIG. 10, and FIG. 11.

Figure 8:
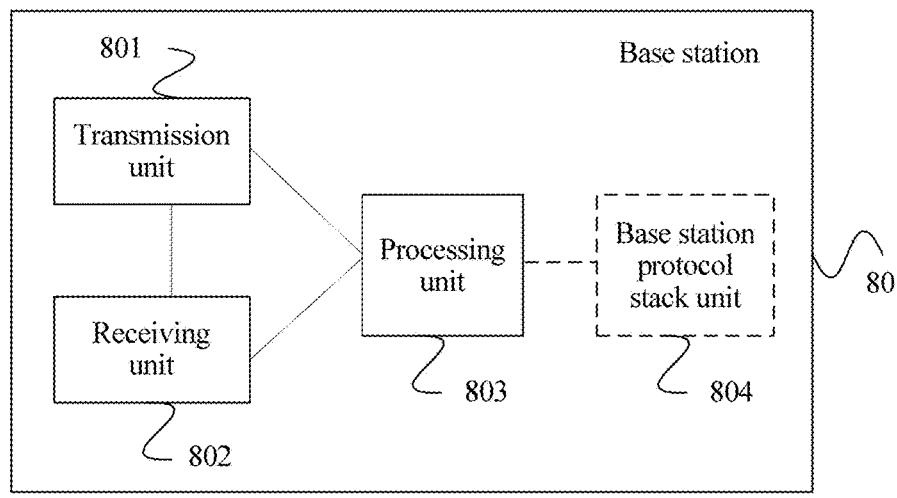
FIG. 8 is a schematic structural diagram of a base station according to an embodiment of the present disclosure.

FIG. 8 is a schematic structural diagram of a base station according to an embodiment of the present disclosure. A base station 80 provided in this embodiment of the present disclosure includes a transmission unit 801, a receiving unit 802, and a processing unit 803.

The transmission unit 801 is configured to send request information, an identifier of a WLAN AP, and a first IP address of the base station to UE, where the request information is used to request the UE to perform multi-stream aggregation data transmission to the base station using the WLAN AP.

The receiving unit 802 is configured to receive a second IP address assigned by the WLAN AP to the UE and confirmation information that are sent by the UE, where the confirmation information is used to confirm that the UE performs multi-stream aggregation data transmission to the base station using the WLAN AP.

The processing unit 803 is configured to perform multi-stream aggregation data transmission to the UE using the WLAN AP and through an IP tunnel, where the IP tunnel is determined using the first IP address and the second IP address.

Optionally, the base station further includes a base station protocol stack unit 804.

The processing unit 803 is further configured to add an IP header to a first protocol data unit generated at an aggregation layer in the base station protocol stack unit 804, and the transmission unit 801 is further configured to send the first protocol data unit with the added IP header to the UE using the WLAN AP and through the IP tunnel, or the receiving unit 802 is further configured to receive a second protocol data unit that is sent by the UE using the WLAN AP and through the IP tunnel, and the processing unit 803 is further configured to delete an IP header of the second protocol data unit, and instruct an aggregation layer in the base station protocol stack unit 804 to process the second protocol data unit whose IP header is deleted, where the IP header is added by the UE to the second protocol data unit generated at an aggregation layer in a UE protocol stack.

Optionally, before the transmission unit 801 sends the first protocol data unit with the added IP header to the UE using the WLAN AP and through the IP tunnel, the processing unit 803 is further configured to add the IP header to the first protocol data unit generated at the aggregation layer in the base station protocol stack unit 804, where the IP header includes radio bearer information that is corresponding to the first protocol data unit and added by the processing unit 803 according to location information, and the radio bearer information is used by the UE to instruct an aggregation layer entity that is in a mapping relationship with the radio bearer information and in the UE protocol stack to process the first protocol data unit whose IP header is deleted, or after the receiving unit 802 receives the second protocol data unit that is sent by the UE using the WLAN AP and through the IP tunnel, the processing unit 803 is further configured to obtain, from the IP header of the second protocol data unit according to location information, radio bearer information corresponding to the second protocol data unit, delete the IP header of the second protocol data unit, and instruct an aggregation layer entity that is in a mapping relationship with the radio bearer information and in the base station protocol stack unit 804 to process the second protocol data unit whose IP header is deleted.

Optionally, the location information is used to indicate a location of the radio bearer information in the IP header.

The transmission unit 801 is further configured to send the location information to the UE, or the processing unit 803 is further configured to agree on the location information with the UE according to a communications protocol.

Optionally, the radio bearer information includes a radio bearer identifier or a logical channel identifier.

Optionally, the IP header further includes priority information of a logical channel corresponding to the logical channel identifier, or priority information of a radio bearer corresponding to the radio bearer identifier.

Optionally, the aggregation layer in the base station protocol stack unit 804 is used to split the first protocol data unit from a protocol data unit that is transmitted by the transmission unit to the UE using a wireless cellular network, or converge the second protocol data unit whose IP header is deleted and a protocol data unit that is transmitted by the UE to the receiving unit 802 using a wireless cellular network.

Optionally, the aggregation layer includes any one of the following, a PDCP layer, a MAC layer, a RLC layer, and an IP layer.

Optionally, the IP header of the first protocol data unit further includes a source IP address and a destination IP address, where the source IP address is the first IP address, and the destination IP address is the second IP address, or the IP header of the second protocol data unit further includes a source IP address and a destination IP address, where the source IP address is the second IP address, and the destination IP address is the first IP address.

Optionally, the processing unit 803 is further configured to perform integrity protection on the first protocol data unit with the added IP header.

The base station provided in this embodiment of the present disclosure can execute the technical solutions in the foregoing method embodiments, and an implementation principle of the base station is similar to that of the foregoing method embodiment, and is not described herein in this embodiment.

This embodiment of the present disclosure provides a base station. The base station is used as a convergence point and a splitting point. The base station is sensitive to a quality change of a network link in a WLAN, which ensures service continuity, improves user experience, and avoids service discontinuity caused by insensitivity of an EPC to the quality change of the network link in the WLAN when the EPC is used as a convergence point and a splitting point.

Figure 9:
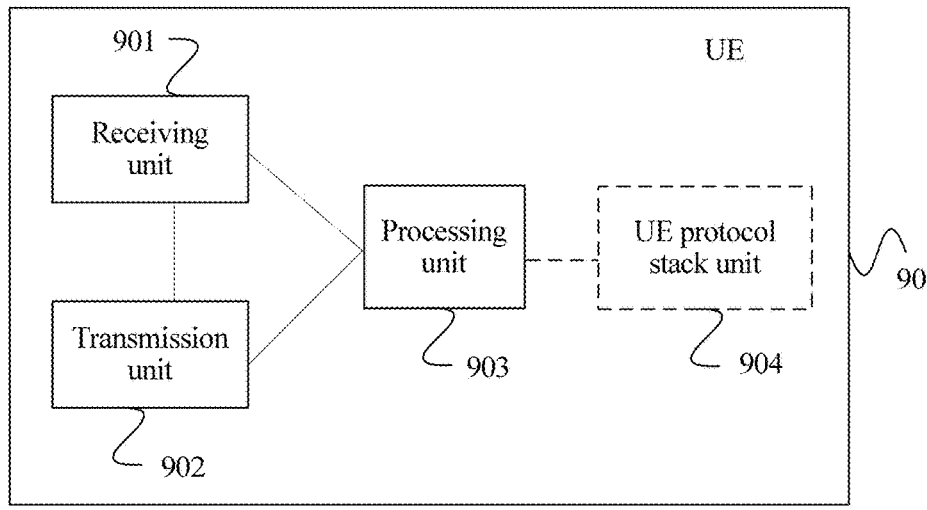
FIG. 9 is a schematic structural diagram of UE according to an embodiment of the present disclosure.

FIG. 9 is a schematic structural diagram of UE according to an embodiment of the present disclosure. As shown in FIG. 9, UE 90 provided in this embodiment of the present disclosure includes a receiving unit 901, a transmission unit 902, and a processing unit 903.

The receiving unit 901 is configured to receive request information, an identifier of a WLAN AP, and a first IP address of a base station that are sent by the base station, where the request information is used to request the UE to perform multi-stream aggregation data transmission to the base station using the WLAN AP.

The transmission unit 902 is configured to send a second IP address assigned by the WLAN AP to the UE and confirmation information to the base station, where the confirmation information is used to confirm that the UE performs multi-stream aggregation data transmission to the base station using the WLAN AP.

The processing unit 903 is configured to perform multi-stream aggregation data transmission to the base station using the WLAN AP and through an IP tunnel, where the IP tunnel is determined using the first IP address and the second IP address.

Optionally, the UE further includes a UE protocol stack unit 904.

The receiving unit 901 is further configured to receive a first protocol data unit that is sent by the base station using the WLAN AP and through the IP tunnel, and the processing unit 903 is further configured to delete an IP header of the first protocol data unit, and instruct an aggregation layer in the UE protocol stack unit 904 to process the first protocol data unit whose IP header is deleted, where the IP header is added by the base station to the first protocol data unit generated at an aggregation layer in a base station protocol stack, or the processing unit 903 is further configured to add an IP header to a second protocol data unit generated at an aggregation layer in the UE protocol stack unit 904, and the transmission unit 902 is further configured to send the second protocol data unit with the added IP header to the base station using the WLAN AP and through the IP tunnel.

Optionally, after the receiving unit 901 receives the first protocol data unit that is sent by the base station using the WLAN AP and through the IP tunnel, the processing unit 903 is further configured to obtain, from the IP header of the first protocol data unit according to location information, radio bearer information corresponding to the first protocol data unit, delete the IP header of the first protocol data unit, and instruct an aggregation layer entity that is in a mapping relationship with the radio bearer information and in the UE protocol stack unit to process the first protocol data unit whose IP header is deleted, or before the transmission unit 902 sends the second protocol data unit with the added IP header to the base station using the WLAN AP and through the IP tunnel, the processing unit 903 is further configured to add the IP header to the second protocol data unit generated at the aggregation layer in the UE protocol stack unit 904, where the IP header includes radio bearer information that is corresponding to the second protocol data unit and added by the UE according to location information, and the radio bearer information is used by the base station to instruct an aggregation layer entity that is in a mapping relationship with the radio bearer information and in the base station protocol stack to process the second protocol data unit whose IP header is deleted.

Optionally, the location information is used to indicate a location of the radio bearer information in the IP header.

The receiving unit 901 is further configured to receive the location information sent by the base station, or the processing unit 903 is further configured to agree on the location information with the base station according to a communications protocol.

Optionally, the radio bearer information includes a radio bearer identifier or a logical channel identifier.

Optionally, the IP header further includes priority information of a logical channel corresponding to the logical channel identifier, or priority information of a radio bearer corresponding to the radio bearer identifier.

Optionally, the aggregation layer in the UE protocol stack unit 904 is used to split the second protocol data unit from a protocol data unit that is transmitted by the transmission unit 902 to the base station using a wireless cellular network, or converge the first protocol data unit whose IP header is deleted and a protocol data unit that is transmitted by the base station to the receiving unit 901 using a wireless cellular network.

Optionally, the aggregation layer includes any one of the following, a PDCP layer, a MAC layer, a RLC layer, and an IP layer.

Optionally, the IP header of the first protocol data unit further includes a source IP address and a destination IP address, where the source IP address is the first IP address, and the destination IP address is the second IP address, or the IP header of the second protocol data unit further includes a source IP address and a destination IP address, where the source IP address is the second IP address, and the destination IP address is the first IP address.

Optionally, the processing unit 903 is further configured to perform integrity protection on the second protocol data unit with the added IP header.

The UE provided in this embodiment of the present disclosure can execute the technical solutions in the foregoing method embodiments, and an implementation principle of the UE is similar to that of the foregoing method embodiment, and is not described herein in this embodiment.

This embodiment of the present disclosure provides UE. A base station is used as a convergence point and a splitting point, to implement offloading between the UE and the base station. The base station is sensitive to a quality change of a network link in a WLAN, which ensures service continuity, improves user experience, and avoids service discontinuity caused by insensitivity of an EPC to the quality change of the network link in the WLAN when the EPC is used as a convergence point and a splitting point.

Figure 10:
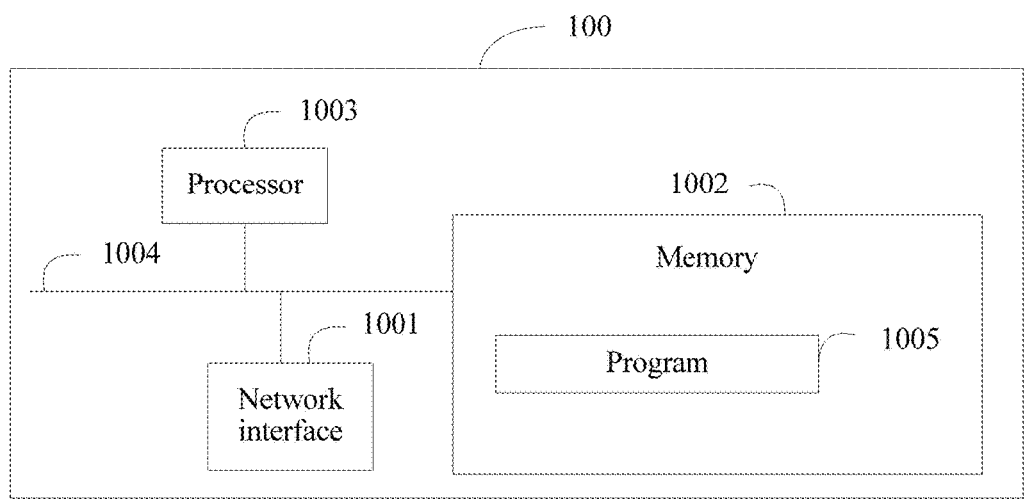
FIG. 10 is a schematic structural diagram of a base station according to another embodiment of the present disclosure.

FIG. 10 is a schematic structural diagram of a base station according to another embodiment of the present disclosure. As shown in FIG. 10, a base station 100 provided in this embodiment includes a network interface 1001, a memory 1002, a processor 1003, and a bus 1004, where the network interface 1001, the memory 1002, and the processor 1003 are separately connected to the bus 1004.

The processor 1003 invokes, using the bus 1004, a program 1005 stored in the memory 1002 and is configured to send request information, an identifier of a WLAN AP, and a first IP address of the base station to the UE using the network interface 1001, where the request information is used to request the UE to perform multi-stream aggregation data transmission to the base station using the WLAN AP, receive, using the network interface 1001, a second IP address assigned by the WLAN AP to the UE and confirmation information that are sent by the UE, where the confirmation information is used to confirm that the UE performs multi-stream aggregation data transmission to the base station 100 using the WLAN AP, and perform, by the processor 1003, multi-stream aggregation data transmission to the UE using the WLAN AP and through an IP tunnel, where the IP tunnel is determined using the first IP address and the second IP address.

Optionally, when the processor 1003 performs multi-stream aggregation data transmission to the UE using the WLAN AP and through the IP tunnel, the processor 1003 is further configured to add an IP header to a first protocol data unit generated according to an aggregation layer function of a base station protocol stack, and send the first protocol data unit with the added IP header to the UE using the WLAN AP, through the IP tunnel, and using the network interface, or receive, using the network interface 1001, a second protocol data unit that is sent by the UE using the WLAN AP and through the IP tunnel, delete an IP header of the second protocol data unit, and process, according to an aggregation layer function of a base station protocol stack, the second protocol data unit whose IP header is deleted, where the IP header is added by the UE to the second protocol data unit generated according to an aggregation layer function of a UE protocol stack.

Optionally, when the processor 1003 performs multi-stream aggregation data transmission to the UE using the WLAN AP and through the IP tunnel, the processor 1003 is further configured to add an IP header to a first protocol data unit generated according to an aggregation layer function of a base station protocol stack, and send the first protocol data unit with the added IP header to the UE using the WLAN AP, through the IP tunnel, and using the network interface 1001, where the IP header includes radio bearer information that is corresponding to the first protocol data unit and added by the processor 1003 according to location information, and the radio bearer information is used by the UE to process, according to an aggregation layer function of an aggregation layer entity that is in a mapping relationship with the radio bearer information and in a UE protocol stack, the first protocol data unit whose IP header is deleted, or receive, using the network interface 1001, a second protocol data unit that is sent by the UE using the WLAN AP and through the IP tunnel, obtain, from an IP header of the second protocol data unit according to location information, radio bearer information corresponding to the second protocol data unit, delete the IP header of the second protocol data unit, and process, according to an aggregation layer function of an aggregation layer entity that is in a mapping relationship with the radio bearer information and in a base station protocol stack, the second protocol data unit whose IP header is deleted.

Optionally, the location information is used to indicate a location of the radio bearer information in the IP header.

The processor 1003 is further configured to send the location information to the UE using the network interface 1001, or agree on the location information with the UE according to a communications protocol.

Optionally, the radio bearer information includes a radio bearer identifier or a logical channel identifier.

Optionally, the IP header further includes priority information of a logical channel corresponding to the logical channel identifier, or priority information of a radio bearer corresponding to the radio bearer identifier.

Optionally, the processor 1003 is further configured to split, according to the aggregation layer function of the base station protocol stack, the first protocol data unit from a protocol data unit that is transmitted by the transmission unit to the UE using a wireless cellular network, or converge the second protocol data unit whose IP header is deleted and a protocol data unit that is transmitted by the UE to the receiving unit using a wireless cellular network.

Optionally, the aggregation layer includes any one of the following, a PDCP layer, a MAC layer, a RLC layer, and an IP layer.

Optionally, the IP header of the first protocol data unit further includes a source IP address and a destination IP address, where the source IP address is the first IP address, and the destination IP address is the second IP address, or the IP header of the second protocol data unit further includes a source IP address and a destination IP address, where the source IP address is the second IP address, and the destination IP address is the first IP address.

Optionally, the processor 1003 is further configured to perform integrity protection on the first protocol data unit with the added IP header.

In the foregoing embodiments, on a base station side, adding or deleting an IP header may be further performed by a processor of a base station or a base station protocol stack.

The base station provided in this embodiment of the present disclosure can execute the technical solutions in the foregoing method embodiments, and an implementation principle of the base station is similar to that of the foregoing method embodiment, and is not described herein in this embodiment.

This embodiment of the present disclosure provides a base station. The base station is used as a convergence point and a splitting point. The base station is sensitive to a quality change of a network link in a WLAN, which ensures service continuity, improves user experience, and avoids service discontinuity caused by insensitivity of an EPC to the quality change of the network link in the WLAN when the EPC is used as a convergence point and a splitting point.

Figure 11:
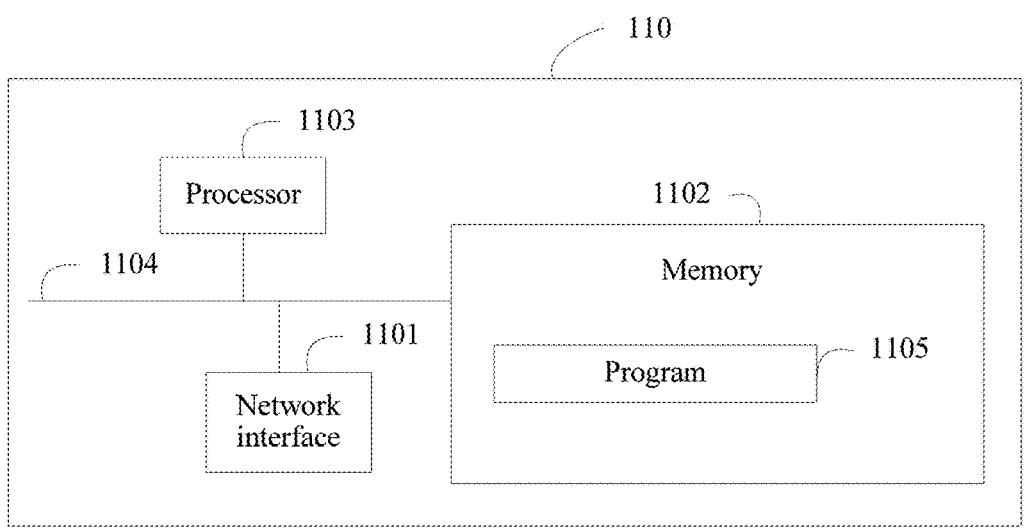
FIG. 11 is a schematic structural diagram of UE according to another embodiment of the present disclosure.

FIG. 11 is a schematic structural diagram of UE according to another embodiment of the present disclosure. User equipment 110 provided in this embodiment includes a network interface 1101, a memory 1102, a processor 1103, and a bus 1104, where the network interface 1101, the memory 1102, and the processor 1103 are separately connected to the bus 1104.

The processor 1103 invokes, using the bus 1104, a program 1105 stored in the memory 1102 and is configured to receive, using the network interface 1101, request information, an identifier of a WLAN AP, and a first IP address of a base station that are sent by the base station, where the request information is used to request the UE to perform multi-stream aggregation data transmission to the base station using the WLAN AP, send a second IP address assigned by the WLAN AP to the UE and confirmation information to the base station using the network interface 1101, where the confirmation information is used to confirm that the UE performs multi-stream aggregation data transmission to the base station using the WLAN AP, and perform, by the processor 1103, multi-stream aggregation data transmission to the base station using the WLAN AP and through an IP tunnel, where the IP tunnel is determined using the first IP address and the second IP address.

Optionally, when the processor 1103 performs multi-stream aggregation data transmission to the base station using the WLAN AP and through the IP tunnel, the processor 1103 is further configured to receive, using the network interface 1101, a first protocol data unit that is sent by the base station using the WLAN AP and through the IP tunnel, delete an IP header of the first protocol data unit, and process, according to an aggregation layer function of a UE protocol stack, the first protocol data unit whose IP header is deleted, where the IP header is added by the base station to the first protocol data unit generated according to an aggregation layer function of a base station protocol stack, or add an IP header to a second protocol data unit generated according to an aggregation layer function of a UE protocol stack, and send the second protocol data unit with the added IP header to the base station using the WLAN AP, through the IP tunnel, and using the network interface.

Optionally, when the processor 1103 performs multi-stream aggregation data transmission to the base station using the WLAN AP and through the IP tunnel, the processor 1103 is further configured to receive, using the network interface 1101, the first protocol data unit that is sent by the base station using the WLAN AP and through the IP tunnel, obtain, from an IP header of the first protocol data unit according to location information, radio bearer information corresponding to the first protocol data unit, delete the IP header of the first protocol data unit, and process, according to an aggregation layer function of an aggregation layer entity that is in a mapping relationship with the radio bearer information and in a UE protocol stack, the first protocol data unit whose IP header is deleted, or add, by the processor 1103, an IP header to a second protocol data unit generated according to an aggregation layer function of a UE protocol stack, and send the second protocol data unit with the added IP header to the base station using the WLAN AP, through the IP tunnel, and using the network interface 1101, where the IP header includes radio bearer information that is corresponding to the second protocol data unit and added by the processor according to location information, and the radio bearer information is used by the base station to process, according to an aggregation layer function of an aggregation layer entity that is in a mapping relationship with the radio bearer information and in a base station protocol stack, the second protocol data unit whose IP header is deleted.

Optionally, the location information is used to indicate a location of the radio bearer information in the IP header.

The processor 1103 is further configured to receive, using the network interface, the location information sent by the base station, or agree on the location information with the UE according to a communications protocol.

Optionally, the radio bearer information includes a radio bearer identifier or a logical channel identifier.

Optionally, the IP header further includes priority information of a logical channel corresponding to the logical channel identifier, or priority information of a radio bearer corresponding to the radio bearer identifier.

Optionally, the processor 1103 is further configured to split, according to the aggregation layer function of the UE protocol stack, the second protocol data unit from a protocol data unit that is transmitted by the transmission unit to the base station using a wireless cellular network, or converge the first protocol data unit whose IP header is deleted and a protocol data unit that is transmitted by the base station to the receiving unit using a wireless cellular network.

Optionally, the aggregation layer includes any one of the following, a PDCP layer, a MAC layer, a RLC layer, and an IP layer.

Optionally, the IP header of the first protocol data unit further includes a source IP address and a destination IP address, where the source IP address is the first IP address, and the destination IP address is the second IP address, or the IP header of the second protocol data unit further includes a source IP address and a destination IP address, where the source IP address is the second IP address, and the destination IP address is the first IP address.

Optionally, the processor 1103 is further configured to perform integrity protection on the second protocol data unit with the added IP header.

On a UE side, adding or deleting an IP header may be further performed by a processor of UE or a UE protocol stack.

The UE provided in this embodiment of the present disclosure can execute the technical solutions in the foregoing method embodiments, and an implementation principle of the UE is similar to that of the foregoing method embodiment, and is not described herein in this embodiment.

This embodiment of the present disclosure provides UE. A base station is used as a convergence point and a splitting point, to implement offloading between the UE and the base station. The base station is sensitive to a quality change of a network link in a WLAN, which ensures service continuity, improves user experience, and avoids service discontinuity caused by insensitivity of an EPC to the quality change of the network link in the WLAN when the EPC is used as a convergence point and a splitting point.

It should be understood that the term "and/or" in this specification describes only an association relationship for describing associated objects and represents that three relationships may exist. For example, A and/or B may represent the following three cases, only A exists, both A and B exist, and only B exists. In addition, the character "/" in this specification generally indicates an "or" relationship between the associated objects.

It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A data transmission method, comprising:
 sending, by a base station, request information, an identifier of a wireless local area network (WLAN) access point (AP), and a first Internet Protocol (IP) address of the base station to user equipment, wherein the request information is used to request the user equipment to perform multi-stream aggregation data transmission to the base station using the WLAN AP;
 receiving, by the base station, a second IP address assigned by the WLAN AP to the user equipment and confirmation information that are sent by the user equipment, wherein the confirmation information is used to confirm that the user equipment performs the multi-stream aggregation data transmission to the base station using the WLAN AP; and
 performing, by the base station, the multi-stream aggregation data transmission to the user equipment using the WLAN AP and through an IP tunnel, wherein the IP tunnel is determined using the first IP address and the second IP address.

2. The method according to claim 1, wherein the base station has a base station protocol stack, and wherein performing the multi-stream aggregation data transmission to the user equipment comprises:
 adding, by the base station, an IP header to a first protocol data unit generated at an aggregation layer in the base station protocol stack, and sending the first protocol data unit with the added IP header to the user equipment using the WLAN AP and through the IP tunnel; or
 receiving, by the base station, a second protocol data unit that is sent by the user equipment using the WLAN AP and through the IP tunnel, deleting an IP header of the second protocol data unit, and instructing the aggregation layer in the base station protocol stack to process the second protocol data unit whose IP header is deleted, wherein the IP header is added by the user equipment to the second protocol data unit generated at an aggregation layer in a user equipment protocol stack.

3. The method according to claim 2, wherein adding the IP header to the first protocol data unit, and sending the first protocol data unit with the added IP header to the user equipment comprises adding, by the base station, the IP header to the first protocol data unit generated at the aggregation layer in the base station protocol stack, and sending the first protocol data unit with the added IP header to the user equipment using the WLAN AP and through the IP tunnel, wherein the IP header comprises radio bearer information that is corresponding to the first protocol data unit and added by the base station according to location information, and the radio bearer information is used by the user equipment to instruct an aggregation layer entity that is in a mapping relationship with the radio bearer information and in the user equipment protocol stack to process the first protocol data unit whose IP header is deleted, or wherein receiving the second protocol data unit that is sent by the user equipment, deleting the IP header of the second protocol data unit, and instructing the aggregation layer in the base station protocol stack to process the second protocol data unit comprises receiving, by the base station, the second protocol data unit that is sent by the user equipment using the WLAN AP and through the IP tunnel, obtaining, from the IP header of the second protocol data unit according to location information, radio bearer information corresponding to the second protocol data unit, deleting the IP header of the second protocol data unit, and instructing an aggregation layer entity that is in a mapping relationship with the radio bearer information and in the base station protocol stack to process the second protocol data unit whose IP header is deleted.

4. The method according to claim 3, wherein the location information is sent by the base station to the user equipment, or agreed by the base station and the user equipment according to a communications protocol, and wherein the location information is used to indicate a location of the radio bearer information in the IP header.

5. The method according to claim 3, wherein the radio bearer information comprises a radio bearer identifier or a logical channel identifier.

6. The method according to claim 5, wherein the IP header further comprises priority information of a logical channel corresponding to the logical channel identifier, or priority information of a radio bearer corresponding to the radio bearer identifier.

7. The method according to claim 2, further comprising performing, by the base station, integrity protection on the first protocol data unit with the added IP header.

8. A data transmission method, comprising:
receiving, by user equipment, request information, an identifier of a wireless local area network (WLAN) access point (AP), and a first Internet Protocol (IP) address of a base station that are sent by the base station, wherein the request information is used to request the user equipment to perform multi-stream aggregation data transmission to the base station using the WLAN AP;
sending, by the user equipment, a second IP address assigned by the WLAN AP to the user equipment and confirmation information to the base station, wherein the confirmation information is used to confirm that the user equipment performs the multi-stream aggregation data transmission to the base station using the WLAN AP; and
performing, by the user equipment, the multi-stream aggregation data transmission to the base station using the WLAN AP and through an IP tunnel, wherein the IP tunnel is determined using the first IP address and the second IP address.

9. The method according to claim 8, wherein the user equipment has a user equipment protocol stack, and wherein performing the multi-stream aggregation data transmission to the base station comprises:
receiving, by the user equipment, a first protocol data unit that is sent by the base station using the WLAN AP and through the IP tunnel, deleting an IP header of the first protocol data unit, and instructing an aggregation layer in the user equipment protocol stack to process the first protocol data unit whose IP header is deleted, wherein the IP header is added by the base station to the first protocol data unit generated at an aggregation layer in a base station protocol stack; or
adding, by the user equipment, an IP header to a second protocol data unit generated at the aggregation layer in the user equipment protocol stack, and sending the second protocol data unit with the added IP header to the base station using the WLAN AP and through the IP tunnel.

10. The method according to claim 9, wherein receiving the first protocol data unit, deleting the IP header of the first protocol data unit, and instructing the aggregation layer in the user equipment protocol stack to process the first protocol data unit comprises receiving, by the user equipment, the first protocol data unit that is sent by the base station using the WLAN AP and through the IP tunnel, obtaining, from the IP header of the first protocol data unit according to location information, radio bearer information corresponding to the first protocol data unit, deleting the IP header of the first protocol data unit, and instructing an aggregation layer entity that is in a mapping relationship with the radio bearer information and in the user equipment protocol stack to process the first protocol data unit whose IP header is deleted, or wherein adding the IP header to the second protocol data unit, and sending the second protocol data unit with the added IP header to the base station comprises adding, by the user equipment, the IP header to the second protocol data unit generated at the aggregation layer in the user equipment protocol stack, and sending the second protocol data unit with the added IP header to the base station using the WLAN AP and through the IP tunnel, wherein the IP header comprises radio bearer information that is corresponding to the second protocol data unit and added by the user equipment according to location information, and the radio bearer information is used by the base station to instruct an aggregation layer entity that is in a mapping relationship with the radio bearer information and in the base station protocol stack to process the second protocol data unit whose IP header is deleted.

11. The method according to claim 10, wherein the location information is sent by the base station to the user equipment, or agreed by the base station and the user equipment according to a communications protocol, and wherein the location information is used to indicate a location of the radio bearer information in the IP header.

45

12. The method according to claim 10, wherein the radio bearer information comprises a radio bearer identifier or a logical channel identifier.

13. The method according to claim 12, wherein the IP header further comprises priority information of a logical channel corresponding to the logical channel identifier, or priority information of a radio bearer corresponding to the radio bearer identifier.

14. The method according to claim 9, further comprising performing, by the user equipment, integrity protection on the second protocol data unit with the added IP header.

15. A base station, comprising:
a network interface;
a memory;
a processor; and
a bus,
wherein the network interface, the memory, and the processor are separately connected to the bus,
wherein the processor invokes, using the bus, a program stored in the memory and is configured to:
send request information, an identifier of a wireless local area network (WLAN) access point (AP), and a first Internet Protocol (IP) address of the base station to user equipment using the network interface, wherein the request information is used to request the user equipment to perform multi-stream aggregation data transmission to the base station using the WLAN AP;
receive, using the network interface, a second IP address assigned by the WLAN AP to the user equipment and confirmation information that are sent by the user equipment, wherein the confirmation information is used to confirm that the user equipment performs the multi-stream aggregation data transmission to the base station using the WLAN AP; and
perform, the multi-stream aggregation data transmission to the user equipment using the WLAN AP and through an IP tunnel, wherein the IP tunnel is determined using the first IP address and the second IP address.

16. The base station according to claim 15, wherein when performing the multi-stream aggregation data transmission to the user equipment using the WLAN AP and through the IP tunnel, the processor is further configured to:
add an IP header to a first protocol data unit generated according to an aggregation layer function of a base station protocol stack, and send the first protocol data unit with the added IP header to the user equipment using the WLAN AP, through the IP tunnel, and using the network interface; or
receive, using the network interface, a second protocol data unit that is sent by the user equipment using the WLAN AP and through the IP tunnel, delete an IP header of the second protocol data unit, and process, according to an aggregation layer function of a base station protocol stack, the second protocol data unit whose IP header is deleted, wherein the IP header is added by the user equipment to the second protocol data unit generated according to an aggregation layer function of a user equipment protocol stack.

17. The base station according to claim 16, wherein the processor is further configured to perform integrity protection on the first protocol data unit with the added IP header.

18. The base station according to claim 15, wherein when performing the multi-stream aggregation data transmission

46 to the user equipment using the WLAN AP and through the IP tunnel, the processor is further configured to:
add an IP header to a first protocol data unit generated according to an aggregation layer function of a base station protocol stack, and send the first protocol data unit with the added IP header to the user equipment using the WLAN AP, through the IP tunnel, and using the network interface, wherein the IP header comprises radio bearer information that is corresponding to the first protocol data unit and added by the processor according to location information, and the radio bearer information is used by the user equipment to process, according to an aggregation layer function of an aggregation layer entity that is in a mapping relationship with the radio bearer information and in a user equipment protocol stack, the first protocol data unit whose IP header is deleted; or
receive, using the network interface, a second protocol data unit that is sent by the user equipment using the WLAN AP and through the IP tunnel, obtain, from an IP header of the second protocol data unit according to location information, radio bearer information corresponding to the second protocol data unit, delete the IP header of the second protocol data unit, and process, according to an aggregation layer function of an aggregation layer entity that is in a mapping relationship with the radio bearer information and in a base station protocol stack, the second protocol data unit whose IP header is deleted.

19. The base station according to claim 18, wherein the location information is used to indicate a location of the radio bearer information in the IP header, and wherein the processor is further configured to:
send the location information to the user equipment using the network interface; or
agree on the location information with the user equipment according to a communications protocol.

20. The base station according to claim 18, wherein the radio bearer information comprises a radio bearer identifier or a logical channel identifier.

21. The base station according to claim 20, wherein the IP header further comprises priority information of a logical channel corresponding to the logical channel identifier, or priority information of a radio bearer corresponding to the radio bearer identifier.

22. A user equipment, comprising:
a network interface;
a memory;
a processor; and
a bus,
wherein the network interface, the memory, and the processor are separately connected to the bus,
wherein the processor invokes, using the bus, a program stored in the memory and is configured to:
receive, using the network interface, request information, an identifier of a wireless local area network (WLAN) access point (AP), and a first Internet Protocol (IP) address of a base station that are sent by the base station, wherein the request information is used to request the user equipment to perform multi-stream aggregation data transmission to the base station using the WLAN AP;
send a second IP address assigned by the WLAN AP to the user equipment and confirmation information to the base station using the network interface, wherein the confirmation information is used to confirm that the user equipment performs the multi-stream aggregation data transmission to the base station using the WLAN AP; and perform, by the processor, the multi-stream aggregation data transmission to the base station using the WLAN AP and through an IP tunnel, wherein the IP tunnel is determined using the first IP address and the second IP address.

23. The user equipment according to claim 22, wherein when performing the multi-stream aggregation data transmission to the base station using the WLAN AP and through the IP tunnel, the processor is further configured to:

receive, using the network interface, a first protocol data unit that is sent by the base station using the WLAN AP and through the IP tunnel, delete an IP header of the first protocol data unit, and process, according to an aggregation layer function of a user equipment protocol stack, the first protocol data unit whose IP header is deleted, wherein the IP header is added by the base station to the first protocol data unit generated according to an aggregation layer function of a base station protocol stack; or add an IP header to a second protocol data unit generated according to the aggregation layer function of a user equipment protocol stack, and send the second protocol data unit with the added IP header to the base station using the WLAN AP, through the IP tunnel, and using the network interface.

24. The user equipment according to claim 23, wherein the processor is further configured to perform integrity protection on the second protocol data unit with the added IP header.

25. The user equipment according to claim 22, wherein when performing the multi-stream aggregation data transmission to the base station using the WLAN AP and through the IP tunnel, the processor is further configured to:

receive, using the network interface, a first protocol data unit that is sent by the base station using the WLAN AP and through the IP tunnel, obtain, from an IP header of the first protocol data unit according to location information, radio bearer information corresponding to the first protocol data unit, delete the IP header of the first protocol data unit, and process, according to an aggregation layer function of an aggregation layer entity that is in a mapping relationship with the radio bearer information and in a user equipment protocol stack, the first protocol data unit whose IP header is deleted; or add, by the processor, an IP header to a second protocol data unit generated according to an aggregation layer function of a user equipment protocol stack, and send the second protocol data unit with the added IP header to the base station using the WLAN AP, through the IP tunnel, and using the network interface, wherein the IP header comprises radio bearer information that is corresponding to the second protocol data unit and added by the processor according to location information, and the radio bearer information is used by the base station to process, according to an aggregation layer function of an aggregation layer entity that is in a mapping relationship with the radio bearer information and in a base station protocol stack, the second protocol data unit whose IP header is deleted.

26. The user equipment according to claim 25, wherein the location information is used to indicate a location of the radio bearer information in the IP header, and wherein the processor is further configured to:

receive, using the network interface, the location information sent by the base station; or agree on the location information with the base station according to a communications protocol.

27. The user equipment according to claim 25, wherein the radio bearer information comprises a radio bearer identifier or a logical channel identifier.

28. The user equipment according to claim 27, wherein the IP header further comprises priority information of a logical channel corresponding to the logical channel identifier, or priority information of a radio bearer corresponding to the radio bearer identifier.

* * * * *